(12) United States Patent (10) Patent No.: US 9,310,916 B2
Krah (45) Date of Patent: Apr. 12, 2016

(54) DISPLAY TO TOUCH CROSSTALK COMPENSATION

(75) Inventor: Christoph Horst Krah, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1045 days.

(21) Appl. No.: 13/007,459

(22) Filed: Jan. 14, 2011

(65) Prior Publication Data

US 2012/0182251 A1 Jul. 19, 2012

(51) Int. Cl.
*G09G 5/00* (2006.01)
*G06F 3/041* (2006.01)

(52) U.S. Cl.
CPC ............ *G06F 3/0412* (2013.01); *G06F 3/0418* (2013.01)

(58) Field of Classification Search
CPC .............................. G06F 3/0304; G06F 3/017
USPC ................... 345/58, 87, 92, 174, 176; 349/19
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,706,023 A | 1/1998 | Nagata et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |

(Continued)

FOREIGN PATENT DOCUMENTS

| | | |
|---|---|---|
| CN | 1612193 A | 5/2005 |
| JP | 2000-163031 A | 6/2000 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Calvin C Ma
(74) *Attorney, Agent, or Firm* — Morrison & Foerster LLP

(57) ABSTRACT

A touch sensitive display capable of compensating for crosstalk in the display is disclosed. Crosstalk in display components can be reduced, eliminated, or otherwise compensated for by reducing or eliminating parasitic capacitances that cause the crosstalk. To do so, gate voltages to the display components, such as thin film transistors (TFTs), that introduce the parasitic capacitances can be reduced or otherwise adjusted. In one approach, the gate voltage can be set at multiple different low levels to generate respective sets of touch signals having different amounts of crosstalk. The different crosstalk amounts can then be used to determine and compensate for the crosstalk in the touch signals. In another approach, gate voltage can be modulated between multiple different low levels to push crosstalk out of band with the generated touch signals. The out-of-band crosstalk can then be used to compensate for the crosstalk in the touch signals.

22 Claims, 16 Drawing Sheets

(56) References Cited

U.S. PATENT DOCUMENTS

| | | |
|---|---|---|
| 2005/0104829 A1 | 5/2005 | Aoki |
| 2005/0253773 A1* | 11/2005 | Sekiguchi ............... 345/1.1 |
| 2006/0026521 A1 | 2/2006 | Hotelling et al. |
| 2006/0197753 A1 | 9/2006 | Hotelling |
| 2006/0202969 A1* | 9/2006 | Hauck ............... 345/173 |
| 2007/0146281 A1 | 6/2007 | Hosihara et al. |
| 2008/0042992 A1 | 2/2008 | Kim |
| 2008/0062148 A1* | 3/2008 | Hotelling et al. ........... 345/174 |
| 2008/0062489 A1* | 3/2008 | Jeong et al. ............... 359/24 |
| 2008/0158169 A1* | 7/2008 | O'Connor et al. ........... 345/173 |
| 2009/0122035 A1* | 5/2009 | Ito ............... 345/204 |
| 2009/0201242 A1* | 8/2009 | Govil ............... 345/98 |
| 2009/0251427 A1 | 10/2009 | Hung et al. |
| 2009/0256817 A1* | 10/2009 | Perlin et al. ........... 345/174 |
| 2009/0303203 A1* | 12/2009 | Yilmaz et al. ........... 345/174 |
| 2010/0059294 A1 | 3/2010 | Elias et al. |
| 2010/0079402 A1 | 4/2010 | Grunthaner et al. |
| 2010/0090967 A1 | 4/2010 | Jang |
| 2010/0097348 A1 | 4/2010 | Park et al. |
| 2010/0156811 A1 | 6/2010 | Long et al. |
| 2010/0253638 A1* | 10/2010 | Yousefpor et al. ........... 345/173 |
| 2010/0295824 A1* | 11/2010 | Noguchi et al. ........... 345/175 |
| 2012/0130246 A1* | 5/2012 | Haider et al. ........... 600/447 |

FOREIGN PATENT DOCUMENTS

| | | |
|---|---|---|
| JP | 2002-342033 A | 11/2002 |
| TW | 388045 B | 4/2000 |
| WO | WO-2012/096853 A1 | 7/2012 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report mailed May 3, 2012, for PCT Patent Application No. PCT/US12/20546, filed Jan. 6, 2012, two pages.

Search Report for ROC (Taiwan) Application No. 101101488, dated Mar. 26, 2014, with English translation, two pages.

Chinese Search Report mailed May 27, 2014, for CN Application No. 201210009579.9, filed Jan. 13, 2012, two pages.

European Search Report mailed Jan. 5, 2015, for EP Patent Application No. EP 12150594.5, six pages.

* cited by examiner

DISPLAY TO TOUCH CROSSTALK COMPENSATION

FIELD

This relates generally to touch sensitive devices and more particularly, to compensating for crosstalk between display and touch components in touch sensitive devices.

BACKGROUND

Many types of input devices are available for performing operations in a computing system, such as buttons or keys, mice, trackballs, touch sensor panels, joysticks, touch pads, touch screens, and the like. Touch sensitive devices, and touch screens, in particular, are becoming increasingly popular because of their ease and versatility of operation as well as their declining price. Touch sensitive devices can include a touch sensor panel, which can be a clear panel with a touch sensitive surface, and a display device such as a liquid crystal display (LCD) that can be positioned partially or fully behind the panel, or integrated with the panel, so that the touch sensitive surface can substantially cover the viewable area of the display device. Touch sensitive devices can generally allow a user to perform various functions by touching or hovering over the touch sensor panel using one or more fingers, a stylus or other object at a location often dictated by a user interface (UI) including virtual buttons, keys, bars, displays, and other elements, being displayed by the display device. In general, touch screens can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

The ability to recognize and interpret the touch or hover event can be compromised by crosstalk between the display device and the touch sensor panel. However, it can be challenging to substantially reduce or eliminate the crosstalk so that the touch sensitive device can perform touch and hover operations effectively and efficiently.

SUMMARY

This relates to a touch sensitive display that can compensate for crosstalk between touch and display components. The touch sensitive display can include an active area of pixels having display components for displaying graphics and/or text data during a display mode of the display, and touch components for sensing a touch or hover event during a touch mode of the display. During the touch mode, some display components, such as thin film transistors (TFTs), can introduce crosstalk that can interfere with touch signals. To reduce the crosstalk, gate voltages that drive the TFTs can be reduced or otherwise adjusted so as to reduce parasitic capacitances causing the crosstalk. In one example, during the touch mode, the gate voltage can be at multiple different low levels during different scans of the active area (to sense the touch or hover event), resulting in different crosstalk components for each scan. These different crosstalk components can then be used to determine and compensate for the crosstalk in the display. In another example, during the touch mode, the gate voltage can be modulated during a scan of the active area to push at least a portion of the crosstalk component out-of-band. The out-of-band crosstalk component can then be used to compensate for crosstalk in the display. Crosstalk compensation can advantageously improve touch and hover sensing in the touch sensitive display by providing clearer, more accurate touch and hover events for processing.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to a touch sensitive display that can compensate for crosstalk between touch and display components. The touch sensitive display can include an active area of pixels having display components for displaying graphics and/or text data during a display mode of the display, and touch components for sensing a touch or hover event during a touch mode of the display. During the touch mode, some display components, such as thin film transistors (TFTs), can introduce crosstalk that can interfere with touch signals, where the amount of crosstalk can be dependent on a displayed image of the graphics and/or text data. To reduce the image dependent crosstalk, gate voltages that drive the TFTs can be reduced or otherwise adjusted so as to reduce parasitic capacitances causing the crosstalk. To so do, in some embodiments, during the touch mode, the gate voltage can be at a low level during a first scan of the active area (to sense the touch or hover event), at a lower level during a second scan, and at different lower levels at subsequent scans, resulting in different crosstalk components for each scan. These different crosstalk components can then be used to determine and compensate for the crosstalk in the display. In other embodiments, during the touch mode, the gate voltage can be modulated during a scan of the active area to push at least a portion of the crosstalk component out-of-band. The out-of-band crosstalk component can then be used to compensate for crosstalk in the display. Crosstalk compensation can advantageously improve touch and hover sensing in the touch sensitive display by providing clearer, more accurate touch and hover events for processing.

Although some embodiments are described herein in terms of touch sensitive displays, it should be understood that the various embodiments are not so limited, but can be generally applicable to devices utilizing display capabilities during display mode and touch capabilities during touch mode. It should be further understood that although the touch sensitive displays described herein are integrated, where touch sensors and display components are together in a pixel ("in cell" configuration), other touch sensitive displays can also be used, such as a touch sensitive display in which the touch sensors and the display are separate components ("out cell" configuration) and a touch sensitive display in which the touch sensors forms a layer of the display ("on cell" configuration).

Figure 1:
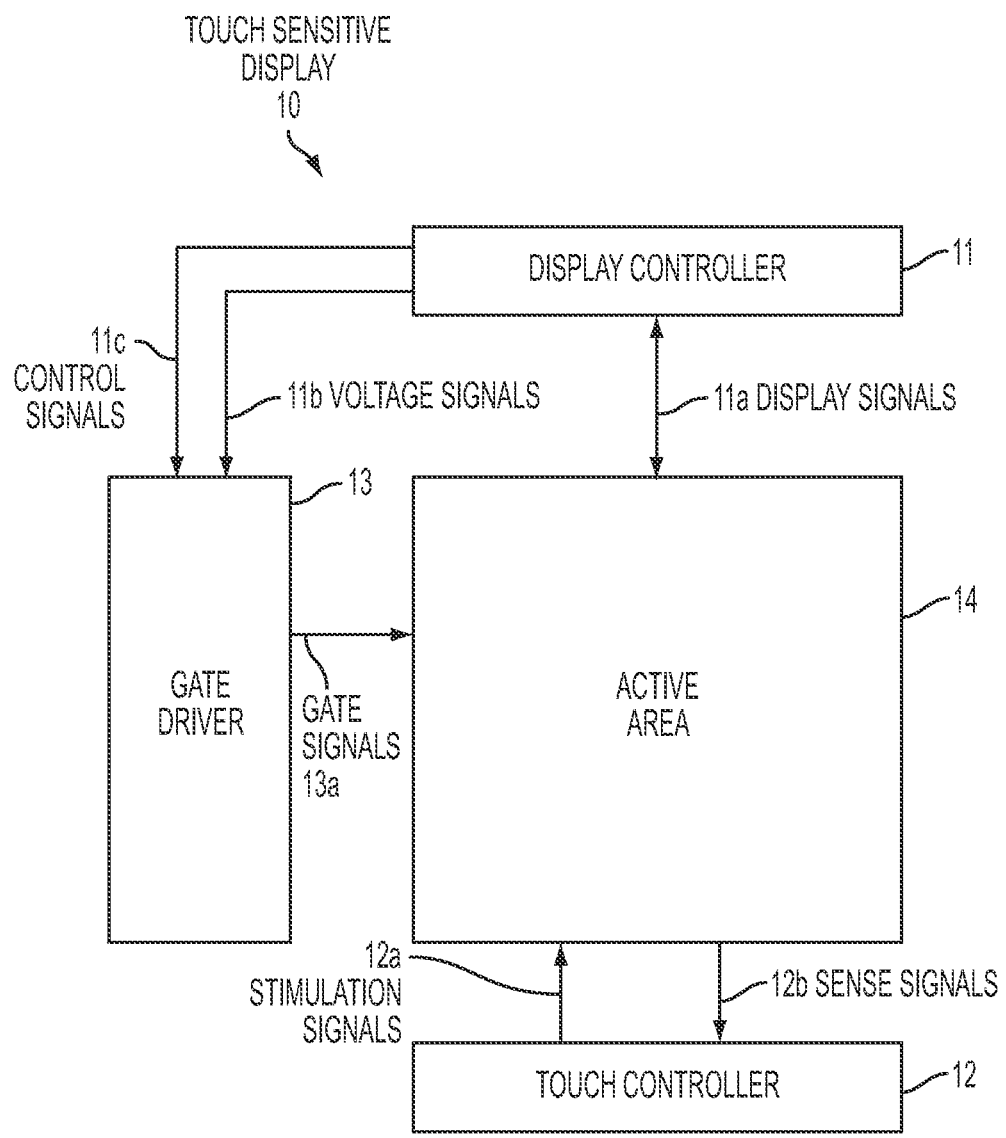
FIG. 1 illustrates an exemplary touch sensitive display having crosstalk compensation capabilities according to various embodiments.

FIG. 1 illustrates an exemplary touch sensitive display having crosstalk compensation capabilities according to various embodiments. In the example of FIG. 1, touch sensitive display 10 can include display controller 11 to drive displaying, touch controller 12 to drive touch and hover sensing, active area 14 to display data and to sense a touching or hovering object, and gate driver 13 to drive gate lines in the active area with voltages to facilitate the displaying and sensing. Note that although the touch controller 12, display controller 11, and gate driver 13 are shown as separate components in FIG. 1, in some embodiments one or more of these components can be combined in a single ASIC. The display 10 can operate in two modes—a display mode and a touch mode. The display mode can include displaying image and/or graphics data on circuitry, e.g., pixels, in the active area 14 of the display 10. The touch mode can include sensing a touch or hover by circuitry, e.g., pixels, in the active area 14 of the display 10. The pixels will be described in more detail in FIGS. 2 and 3.

The active area 14 can integrate display and touch capabilities in circuitry, e.g., pixels, which can be used to display images and/or graphics during the display mode of the display and which can be used to sense a touch or hover on the display during the touch mode. The active area 14 can receive image and/or graphics display signals 11a from the display controller 11 and gate signals 13a from the gate driver 13 for displaying the data on the pixels during the display mode. The active area 14 can receive stimulation signals 12a from the touch controller 12 to stimulate the pixels to sense a touch or hover during the touch mode. The active area 14 can receive the gate signals 13a from the gate driver 13 to help reduce or eliminate interference, e.g., crosstalk, in the display 10 during the touch mode. How the crosstalk can be reduced, eliminated, or otherwise compensated for will be described herein according to various embodiments. The active area 14 can also transmit sense (or touch) signals 12b indicating a touch or hover to the touch controller 12 for processing during the touch mode.

The display controller 11 can drive data lines of the active area 14 and can cause the gate driver 13 to drive gate lines of the active area for displaying image and/or graphics data transmitted on the data lines during the display mode. The display controller 11 can transmit the image and/or graphics display signals 11a to the active area 24 and can transmit voltage signals 11b and control signals 11c to the gate driver 13 during the display mode. The display controller 11 can also transmit the voltage signals 11b and control signals 11c to the gate driver 13 during the touch mode.

The touch controller 12 can drive the active area 14 to sense touch or hover on the display 10. The touch controller 12 can transmit the stimulation signals 12a to the active area 14 to stimulate the pixels to sense touch or hover during the touch mode. The touch controller 12 can receive the sense signals 12b from the active area 14 during the touch mode. In some embodiments, the touch controller 12 can be based on capacitance. By detecting changes in capacitance at each of the active area pixels and noting the position of the pixels, the touch controller 12 can recognize multiple objects and determine one or more of the location, pressure, direction, speed, and acceleration of the objects as they are moved across the display 10. By way of example, some embodiments can be based on self capacitance and some embodiments can be based on mutual capacitance. In some embodiments, the display 10 can be multi-touch, single touch, projection scan, full-imaging multi-touch, or any capacitive touch.

The gate driver 13 can drive gate lines of the active area 14. The gate driver 13 can receive the voltage signals 11b and the control signals 11c from the display controller 11. During the display mode, the gate driver 13 can transmit the voltage signals 11b as the gate signals 13a to the gate lines of the active area 14 to activate the pixels to display images and/or graphics on the display 10. During the touch mode, the gate driver 13 can also transmit the voltage signals 11b as the gate signals 13a to the gate lines of the active area 14 to help reduce or eliminate crosstalk in the display 10. In some embodiments, the magnitudes of the voltage signals 11b can be different between the display and touch modes. The gate signals will be described in more detail in FIG. 2.

Each stimulation signal 12a can stimulate a corresponding drive line or multiple drive lines. Each gate signal 13a can drive a corresponding gate line. Each display signal 11a can drive a corresponding data line. Each sense signal 12b can transmit information of a sensed touch or hover on a corresponding sense line.

Figure 2:
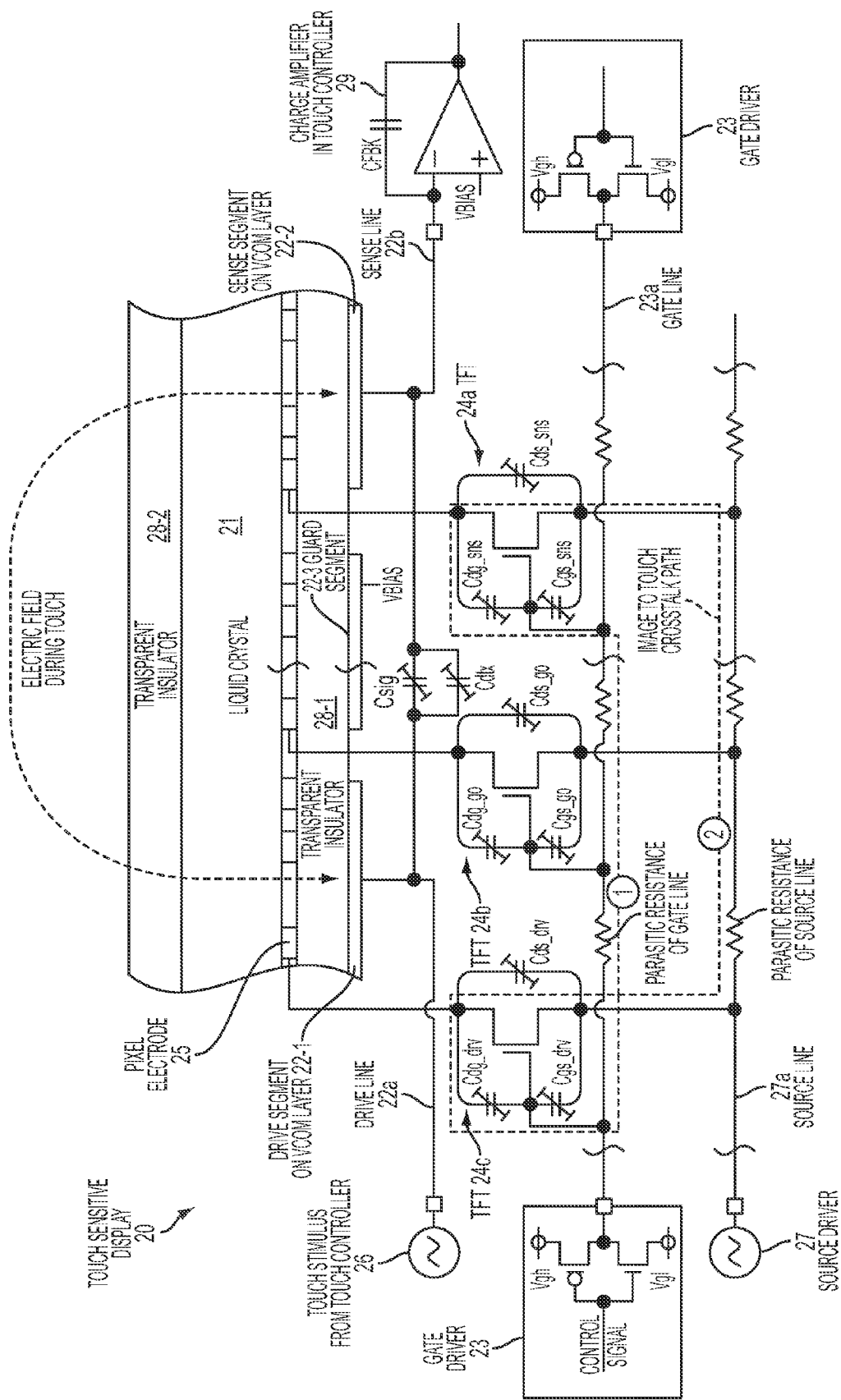
FIG. 2 illustrates a partial circuit diagram of a touch sensitive display having crosstalk compensation capabilities according to various embodiments.

Crosstalk can be introduced in a touch sensitive display in a number of ways. One such way can be through undesirable coupling in the active area that can produce image dependent parasitic capacitances to interfere with touch capacitances during the touch mode. Therefore, by reducing the image dependent parasitic capacitances in the active area, crosstalk in the display can be reduced, eliminated, or otherwise compensated for. FIG. 2 illustrates a partial circuit diagram of a touch sensitive display that can be used to reduce or eliminate crosstalk by reducing parasitic capacitances in the active area of the display. In the example of FIG. 2, parasitic capacitances causing crosstalk can result from undesirable capacitive couplings in thin film transistors (TFTs) 24 in the active area pixels of touch sensitive display 20, where a TFT's gate line can capacitively couple with its source line to form capacitance Cgs, the gate line with its drain line to form capacitance Cgd, and the source line with the drain line to form capacitance Cds. To reduce the parasitic capacitances and hence the crosstalk, the gate voltage transmitted along gate line 23a can be appropriately reduced or otherwise adjusted during the touch mode.

In the example of FIG. 2, multiple TFTs 24 can drive multiple pixel electrodes 25 to a voltage level provided by source driver 27 along source line 27a when the TFTs are enabled via gate drivers 23. The pixel electrodes 25 can be arranged above a Vcom layer divided into drive segments 22-1, sense segments 22-2, and guard segments 22-3, with transparent insulator 28-1 between the electrodes and the segments. During display mode, the drive, sense, and guard segments 22-1 through 22-3 can be shorted together and driven by a dynamic or static signal dependent on the display controller's drive scheme. The orientation of liquid crystals in liquid crystal layer 21 can be controlled by the magnitude of an electric fringe field between the Vcom segments 22-1 through 22-3 and the pixel electrodes 25.

During touch mode, the sense segments 22-2 can be connected to charge amplifier 29 of a touch controller, the drive segments 22-1 to touch stimulus 26 of the touch controller, and the guard segments 22-3 to a bias voltage (e.g. 2.5V). When the display 20 senses a touch or hover event, the electric field in the display can be coupled from the drive segment 22-1 to the sense segment 22-2 through transparent insulator layers 28-1 and 28-2, the pixel electrodes 25, and the liquid crystal layer 21. Note that the TFTs 24 can be disabled in touch mode by connecting the TFT gates to gate voltage Vgl from gate lines 23a, causing the TFT drains and therefore the pixel electrodes 25 to be floating. As a result, the pixel electrodes 25 and thus the TFT drains can be held at a certain image dependent voltage level. The TFTs 24 can have parasitic capacitances that can cause crosstalk in the proximate drive, guard, and sense segments 22-1 through 22-3. For example, as illustrated in FIG. 2, TFT 24c proximate to a drive segment 22-1 can have parasitic capacitances Cgs_dry between the TFT gate and source lines, Cgd_dry between the TFT gate and drain lines, and Cds_dry between the TFT drain and source lines, causing crosstalk between the TFT and the drive segment. Similarly, TFT 24b proximate to a guard segment 22-3 can have parasitic capacitances Cgs_go between the TFT gate and source lines, Cdg_go between the TFT gate and drain lines, and Cds_go between the TFT drain and source lines, causing crosstalk between the TFT and the guard segment. Also similarly, TFT 24a and a sense segment 22-2 can have parasitic capacitances Cgs_sns between the TFT gate and source lines, Cdg_sns between the TFT gate and drain lines, and Cds_sns between the TFT drain and source lines, causing crosstalk between the TFT and the sense segment.

The TFT parasitic capacitances Cdg, Cds and Cgs can be a function of TFT depletion and therefore dependent on the image dependent drain voltage level Vtft_d, which is equivalent to the pixel voltage level at which the associated pixel electrode is held. Similarly, Cdg, Cds and Cgs can also be dependent on the Vgl voltage level applied to the TFT gate during touch mode.

In a touch sensitive display, drive segment 22-1 can cover multiple pixels and hence multiple TFTs depicted as TFT 24c. For example, a drive segment can cover an array of 18×64 RGB (red, green, blue) pixels, each pixel having as many as 3 TFTs, one per RGB color. Similarly, guard segment 22-3 can cover multiple pixels and hence multiple TFTs depicted as TFT 24b and sense segment 22-2 can cover multiple pixels and multiple TFTs depicted as TFT 24a. However, for simplicity, in FIG. 2, the drive, guard, and sense segments 22-1 through 22-3 are depicted as each covering a single pixel and respective TFT 24c, 24b, and 24a.

During touch mode, a capacitance Cdtx can form between the drive and sense segments 22-1 and 22-2, where the capacitance Cdtx can represent the image dependent crosstalk between the segments. A portion of the crosstalk Cdtx can be caused by the coupling path (depicted by the broken line (1) in FIG. 2) from the drain of the TFT proximate to the drive segment 22-1 to the drain of the TFT proximate to the sense segment 22-2, e.g., from the parasitic capacitance Cdg_dry in the drive segment through the parasitic resistance of the gate line 23a to the parasitic capacitance Cdg_sns in the sense segment. Another portion of the crosstalk Cdtx can be caused by the coupling path (depicted by the broken line (2) in FIG. 2) from the drain of the TFT proximate to the drive segment 22-1 to the drain of the TFT proximate to the sense segment 22-2, e.g., from the parasitic capacitance Cds_dry in the drive segment through the parasitic resistance of the source line 27a to the parasitic capacitance Cds_sns in the sense segment. Since the coupling path has a high-pass response, the crosstalk Cdtx can be frequency dependent and crosstalk compensation can be performed based on the touch stimulus frequency used.

As described previously, the display controller can transmit voltage signals, e.g., a negative high voltage signal Vgl and a positive high voltage signal Vgh, and control signals to the gate drivers 23. The control signals can be used to switch the gate driver 23 between voltage signals Vgl, Vgh according to the display or touch modes. For example, the control signals can activate the gate driver 23 during the display mode to transmit a high voltage signal Vgh to the TFTs 24 for displaying image data. Similarly, the control signals can activate the gate driver 23 during the touch mode to transmit a negative high voltage signal Vgl to the TFTs 24 for reducing crosstalk and for facilitating touch and hover sensing. Accordingly, during touch mode, to reduce crosstalk, the display 20 can reduce or otherwise adjust the negative high voltage signal Vgl to the TFTs 24, thereby reducing the parasitic capacitances in the TFTs.

It is to be understood that a touch sensitive display according to various embodiments is not limited to the components and configurations illustrated in FIGS. 1 and 2, but can include additional or other components in the same or different configurations capable of performing touch and hover sensing according to the various embodiments.

Figure 3:
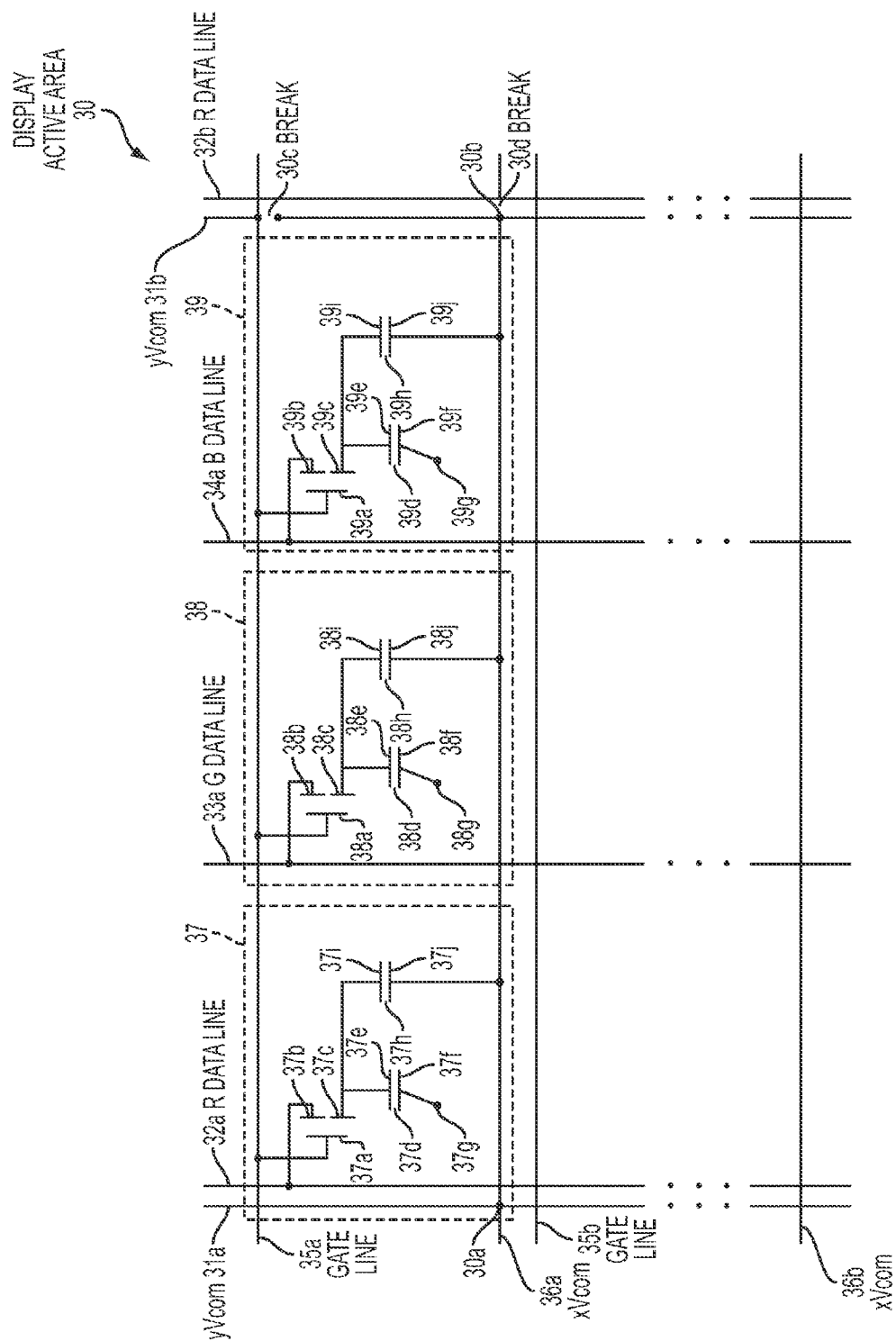
FIG. 3 illustrates a partial circuit diagram of an exemplary pixel in an active area of a touch sensitive display having crosstalk compensation capabilities according to various embodiments.

FIG. 3 illustrates a partial circuit diagram of an exemplary pixel of an active area of a touch sensitive display having crosstalk compensation capabilities according to various embodiments. In the example of FIG. 3, active area 30 can include pixels that can be configured for dual-functionality as both display pixels and touch sensor elements. That is, the pixels can include circuit elements, such as capacitive elements, electrodes, etc., that can operate as part of the display circuitry of the pixels and that can also operate as elements of touch and hover sensing circuitry. In this way, active area 30 can operate as a display with integrated touch and hover sensing capability. FIG. 3 shows details of pixels 37, 38, and 39 of the active area 30. Note that each of the pixels can represent red (R), green (G) or blue (B), with the combination of all three R, G and B pixels forming a single color pixel.

Pixel 38 can include a TFT with gate 38a, source 38b, and drain 38c. As described previously, this TFT can introduce parasitic capacitances into the active area 30 by undesirable capacitive couplings between the gate, source, and drain lines, thereby causing crosstalk. Pixel 38 can also include storage capacitor, Cst 38h, with upper electrode 38i and lower electrode 38j, liquid crystal capacitor, Clc 38d, with pixel electrode 38e and common electrode 38f, and color filter voltage source, Vcf 38g. Pixel 38 can further include a portion of a data line for green (G) color data, Gdata line 33a, and a portion of gate line 35a. As described previously, display signals from a display controller (not shown) can be transmitted along the Gdata line 33a for displaying data during the display mode and gate signals from a gate driver (not shown) can be transmitted along the gate line 35a for helping reduce crosstalk during the touch mode. Gate 38a can be connected to gate line portion 35a, and source 38c can be connected to Gdata line portion 33a. Upper electrode 38i of Cst 38h can be connected to drain 38c, and lower electrode 38j of Cst 38h can be connected to a portion of a common voltage line that runs in the x-direction, xVcom 36a. Pixel electrode 38e of Clc 38d can be connected to drain 38c, and common electrode 38f of Clc 38d can connected to Vcf 38g.

The circuit diagram of pixel 39 can be identical to that of pixel 38. However, as shown in FIG. 3, color data line 34a running through pixel 39 can carry blue (B) color data.

Similar to pixels 38 and 39, pixel 37 can include a TFT with gate 37a, source 37b, and drain 37c, which can introduce parasitic capacitances into the active area 30 thereby causing crosstalk. Pixel 37 can also include storage capacitor, Cst 37h, with upper electrode 37i and lower electrode 37j, liquid crystal capacitor, Clc 37d, with pixel electrode 37e and common electrode 37f, and color filter voltage source, Vcf 37g. Pixel 37 can further include a portion of a data line for red (R) color data, Rdata line 32a, and a portion of gate line 35a. As described previously, display signals from a display controller (not shown) can be transmitted along the Rdata line 32a for displaying data during the display mode and gate signals from a gate driver (not shown) can be transmitted along the gate line 35a for helping reduce crosstalk during the touch mode. Gate 37a can be connected to gate line portion 35a, and source 37b can be connected to Rdata line portion 32a. Upper electrode 37i of Cst 37h can be connected to drain 37c, and lower electrode 37j of Cst 37h can be connected to a portion of xVcom 36a. Pixel electrode 37e of Clc 37d can be connected to drain 37c, and common electrode 37f of Clc 37d can be connected to Vcf 37g.

Unlike pixels 38 and 39, pixel 37 can also include a portion of a common voltage line running in the y-direction, yVcom 31a. In addition, pixel 37 can include a connection 30a that connects portion of yVcom 31a to portion of xVcom 36a. Thus, connection 30a can connect xVcom 36a and yVcom 31a. As described previously, stimulation signals from a touch controller (not shown) can be transmitted along xVcom 36a and sense signals from the active area 30 can be transmitted along yVcom 31a to the touch controller during the touch mode to sense a touch or hover at the pixel 37.

A pixel (only partially shown at the right in FIG. 3) can be similar to pixel 37, except that a portion of yVcom 31b can have a break (open) 30c, and a portion of xVcom 36a can have a break 30d.

Multiple pixels can be grouped together to form separate regions in the active area 30. For example, touch regions in the active area 30 can be formed by groups of pixels (each pixel including a red, green, and blue pixel as in FIG. 3) electrically connected together to form drive regions for driving stimulation signals, sense regions for sensing a touch or hover of an object, such as a finger, on the display, during touch mode, and guard regions between the drive and sense regions for reducing undesirable coupling between the drive and sense regions. The regions can be separated by forming breaks (opens) in the horizontal and/or vertical common lines. For example, yVcom 31b of active area 30 can have break 30c, which can allow pixels above the break to be isolated from pixels below the break. Likewise, xVcom 36a can have break 30d, which can allow pixels to the right of the break to be isolated from pixels to the left of the break.

It is to be understood that pixel configurations according to various embodiments are not limited to that illustrated in FIG. 3, but can include other configurations capable of crosstalk compensation.

Figure 4:
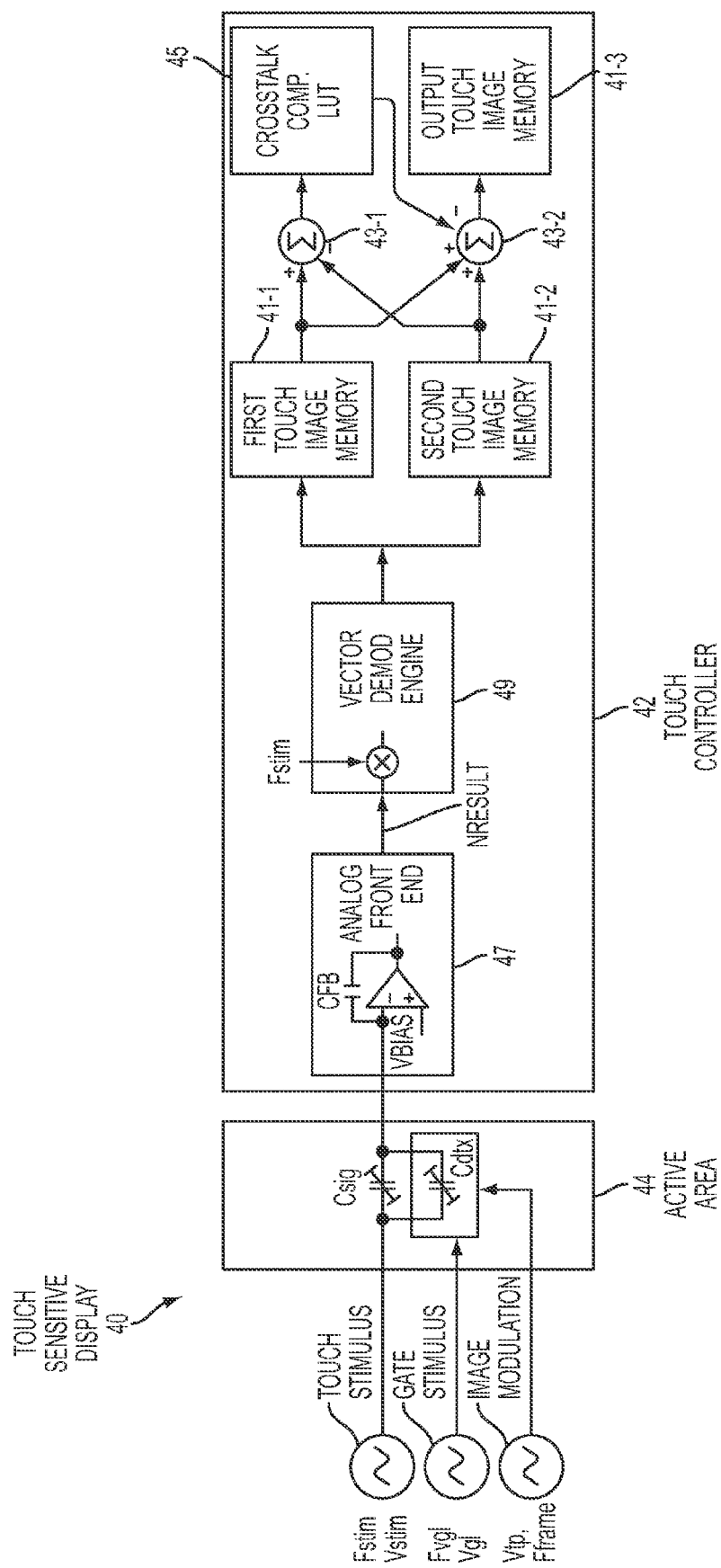
FIG. 4 illustrates exemplary touch circuitry of a touch sensitive display having crosstalk compensation capabilities according to various embodiments.

FIG. 4 illustrates exemplary touch circuitry of a touch sensitive display having crosstalk compensation capabilities according to various embodiments. In the example of FIG. 4, touch components of touch sensitive display 40 can be used to capture multiple touch images at different gate voltages, determine how much to compensate for crosstalk based on the captured images, and output a crosstalk compensated touch image as a result. Touch stimulus of amplitude Vstim and frequency Fstim can drive a touch pixel in active area 44 of a display during the touch mode to form a capacitance Csig indicative of a touch or hover at the pixel. Gate stimulus of amplitude Vgl and frequency Fvgl can drive a TFT in the pixel and can be reduced or otherwise adjusted in a manner, as described below, so as to help reduce, eliminate, or otherwise compensate for the crosstalk.

The touch pixel capacitance, including Csig and Cdtx, can be inputted to analog front end 47 to generate a count Nresult representative of the touch pixel capacitance Csig+Cdtx, where Cdtx represents the TFT induced crosstalk capacitance which can be dependent on the gate driver voltage Vgl and the average display pixel voltage Vtp level in a given touch pixel region. The display voltage Vtp can vary due to image modulation at the frame frequency Fframe (e.g., 60 Hz). Nresult can then be digitally demodulated at Fstim in vector demodulation engine 49 and posted to a first touch image memory 41-1 during a first scan at a first gate voltage and to a second touch image memory 41-2 during a second scan at a second gate voltage. Subtractor 43-1 can process the first and second touch images from their respective memories 41-1 and 41-2 and send an output indicative of the amount of crosstalk in the touch sensitive display to crosstalk compensation lookup table (LUT) 45. The LUT 45 can lookup the crosstalk compensation value based on the subtractor output and transmit the compensation value to summer 43-2. The summer 43-2 can average the first and second touch images from memories 41-1 and 42-2, subtract the compensation value and post a crosstalk compensated image to output touch image memory 41-3 for further processing.

It is to be understood that additional or other touch components to those of FIG. 4 can be used according to various embodiments.

Figure 5:
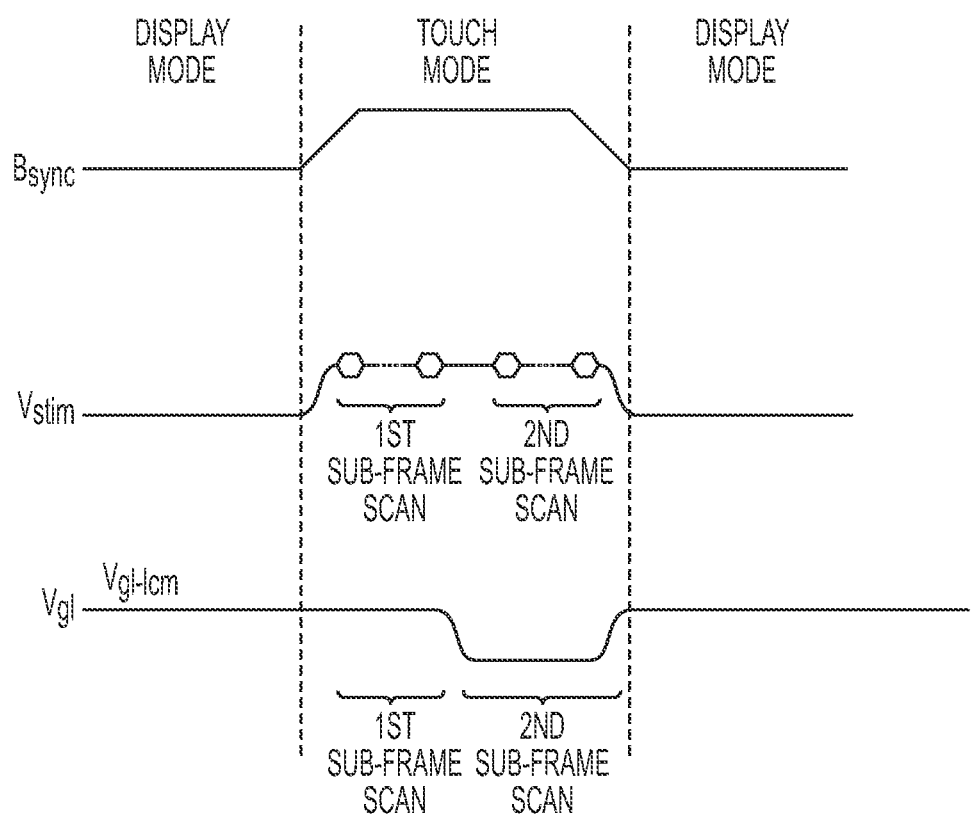
FIG. 5 illustrates an exemplary timing diagram of signals used for crosstalk compensation in a touch sensitive display according to various embodiments.

FIG. 5 illustrates an exemplary timing diagram of signals in touch circuitry, as in FIG. 4, of a touch sensitive display to compensate for crosstalk according to various embodiments. During the touch mode, the touch sensitive display can perform multiple scans of the active area pixels at different gate voltage levels. As previously described, the gate voltage level can affect the strengths of the parasitic capacitances in the pixel TFTs and hence the crosstalk amounts. Therefore, by performing multiple scans at different gate voltage levels, the resulting sense signals can have different amounts of crosstalk. These different amounts can be used to determine how much to compensate the sense signals so as to reduce or eliminate crosstalk therefrom. The timing diagram in FIG. 5 illustrates select signal outputs during the display and touch modes of the touch sensitive display to demonstrate this approach. The signals include a Bsync signal indicative of touch mode when high, a stimulation signal Vstim to stimulate a pixel for sensing a touch or hover during the touch mode, and a gate signal to help facilitate reducing or eliminating crosstalk during the touch mode.

During the display mode, Bsync can be low indicating display mode, Vstim can be at or around zero because the active area is displaying rather than sensing, and Vgl can be at Vgl_lcm (and/or modulating). Note that, during display mode, Vgl can be any suitable value because it can be ignored until the touch mode, while Vgh can be used to provide the gate signals during the display mode, as described previously. In some embodiments, during the display mode, Vstim=−1 to +1 V, Vgl=−9V, and Vgh=10V.

During the touch mode, Bsync can be high indicating touch mode, Vstim can be an AC signal which is modulated relative to positive voltage bias to stimulate the pixels for sensing during the multiple sub-frame scans, e.g., 2 sub-frame scans, and Vgl can have different negative values during the different scans, e.g., a first negative voltage Vgl_touch1 during the first sub-frame scan and a lower negative value Vgl_touch2 during the second sub-frame scan. In this example, Vgl_touch1 during the first sub-frame scan can result in a first crosstalk amount and Vgl_touch2 during the second sub-frame scan can result in a second crosstalk amount. In some embodiments, during the touch mode, Vstim can have a DC component of +2.5V and an AC component of 4Vpp and Vgl_touch1=−9 V during the first sub-frame scan and Vgl_touch2=−12 V during the second sub-frame scan. Each sub-frame scan can be comprised of multiple touch scan steps, e.g. 16 touch scan steps in some embodiments.

Although only two sub-frame scans at two gate voltages are illustrated in FIG. 5, it is to be understood that multiple sub-frame scans at multiple gate voltages can be performed during the touch mode, in which a first sub-frame scan can be performed at a first low gate voltage, a second sub-frame scan at a second low gate voltage, a third sub-frame scan at a third low gate voltage, and so on.

Figure 6:
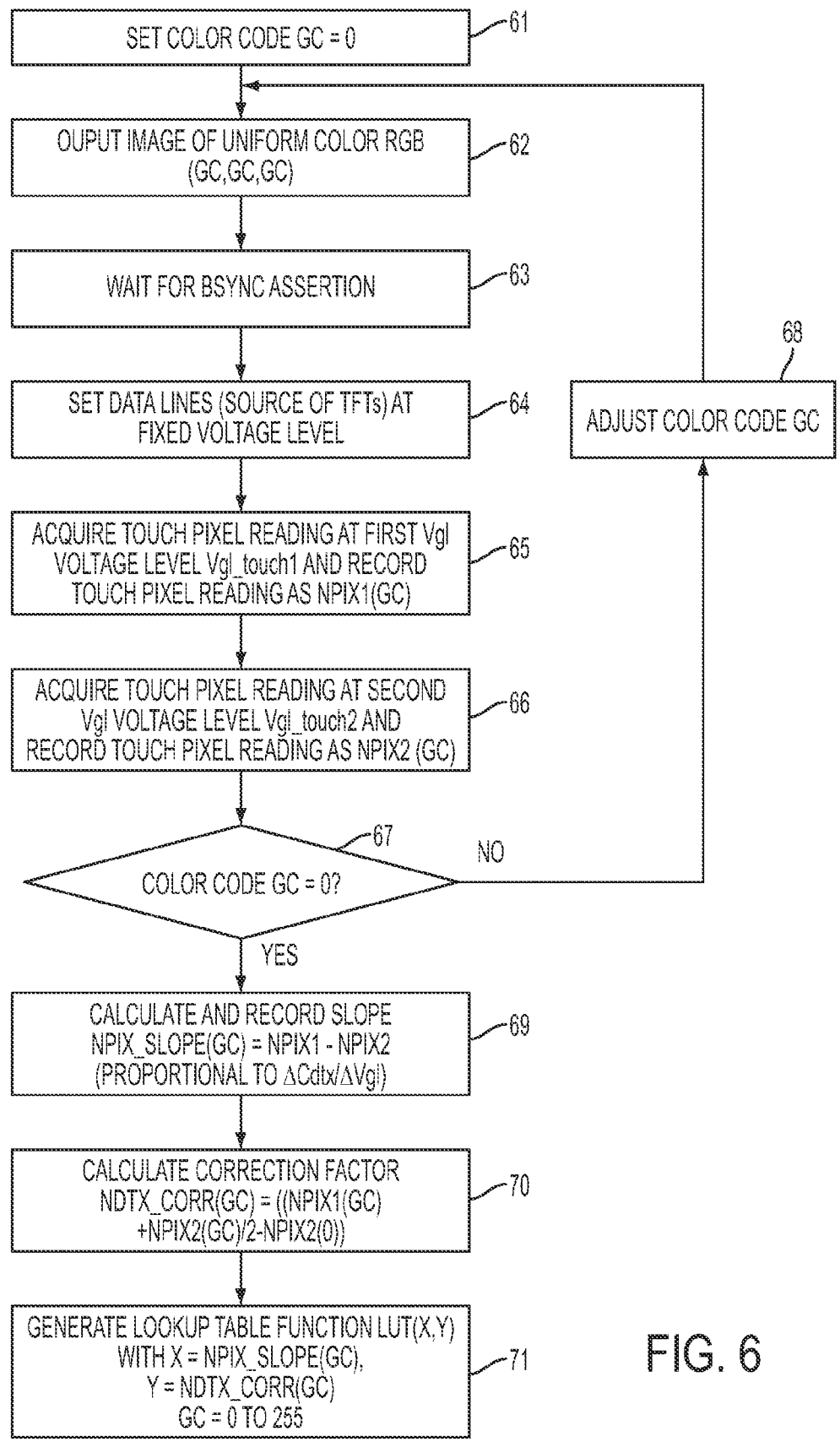
FIG. 6 illustrates an exemplary method for determining crosstalk compensation amounts using gate voltage adjustments in a touch sensitive display according to various embodiments.

FIG. 6 illustrates an exemplary method for determining crosstalk compensation amounts using gate voltage adjustments according to various embodiments. This method can be applied to the touch sensitive display of FIG. 4, for example. In some embodiments, this method can be applied during factory calibration of the display. In some embodiments, this method can be applied during startup or other operations of the display by a user. In the example of FIG. 6, a color code gc can be set to zero, where the color code represents the color of the image outputted by the pixels (61). An image of uniform color having the red, green and blue pixel components set to the color code gc of zero can be outputted from the display controller (62). In some instances, a white image can have a color code gc=255 (i.e. RGB(255,255,255)), while a black image can have a color code gc=0 (i.e. RGB(0,0,0)), etc. The display controller can assert a Bsync signal to indicate that the display is transitioning to touch mode (63). Upon a rising edge of Bsync, data lines connecting to TFT sources in the active area can be set at a fixed voltage level (64). This can be done to ensure that the source biases of the connected TFTs are constant and independent of the voltage level output prior to entering touch mode. After entering touch mode upon the rising edge of Bsync, a first touch pixel can be captured at a first Vgl voltage level Vgl_touch1 and recorded as NPIX1(gc) (65). After adjusting the Vgl voltage level to Vgl_touch2, a second touch pixel can be captured and recorded at NPIX2 (gc) (66). Note that NPIX can be a count that is representative of touch capacitance Csig and crosstalk capacitance Cdtx. The above actions (62)-(66) can be repeated for one or more color codes gc from 1 to 255 (68).

Figure 7:
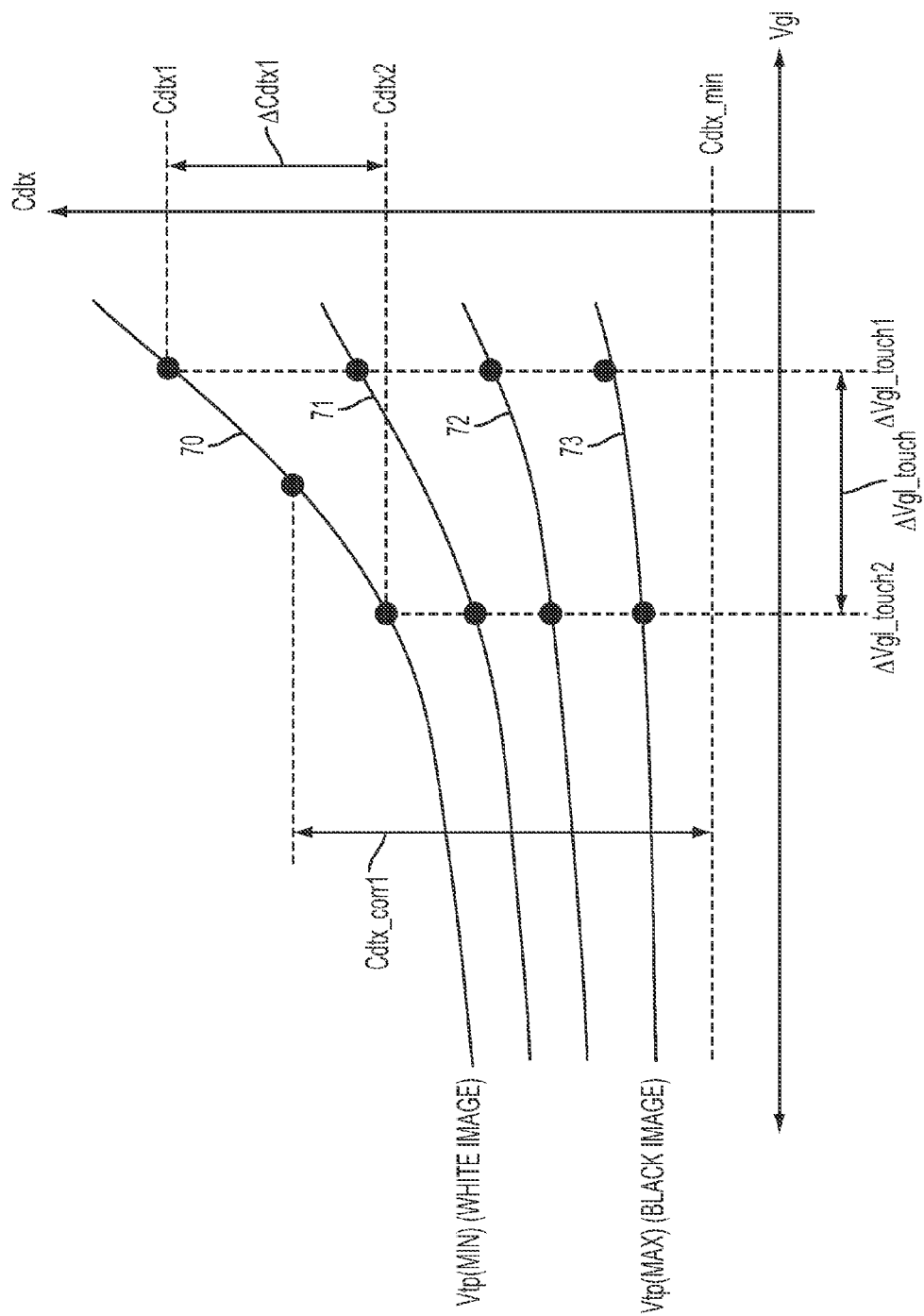
FIG. 7 illustrates a graph of gate driver voltage versus crosstalk amounts that can be used to compensate for crosstalk in a touch sensitive display according to various embodiments.

After the touch pixels have been captured at the desired color code levels (67), a crosstalk LUT can be derived as follows. The captured touch pixels at the various color codes gc and Vgl voltage levels can be plotted as shown in FIG. 7. The slope NPIX_SLOPE(gc) of each graph can be determined by subtracting the touch pixel values NPIX1 and NPIX2 at the different Vgl voltage levels and dividing the result by the difference between the voltage levels, where (NPIX1−NPIX2)/(Vgl_touch1−Vgl_touch2) (69). A crosstalk correlation factor NDTX_CORR(gc) can then be calculated as the average of the touch pixel values NPIX1 and NPIX2 at the different Vgl voltage levels minus the touch pixel value at gc=0, where (NPIX1+NPIX2)/2−NPIX2(0) (70). NPIX_SLOPE can be representative of the average pixel voltage Vtp, and NDTX_CORR can represent the average touch pixel value count between Vgl_touch1 and Vgl_touch2 for a given grey level relative to the touch pixel value NPIX2(0) associated with the lowest cross-coupling capacitance. The cross-coupling capacitance Cdtx can be the lowest at the highest level of depletion, which is the case for a black uniform image and minimum Vgl voltage level.

Figure 8:
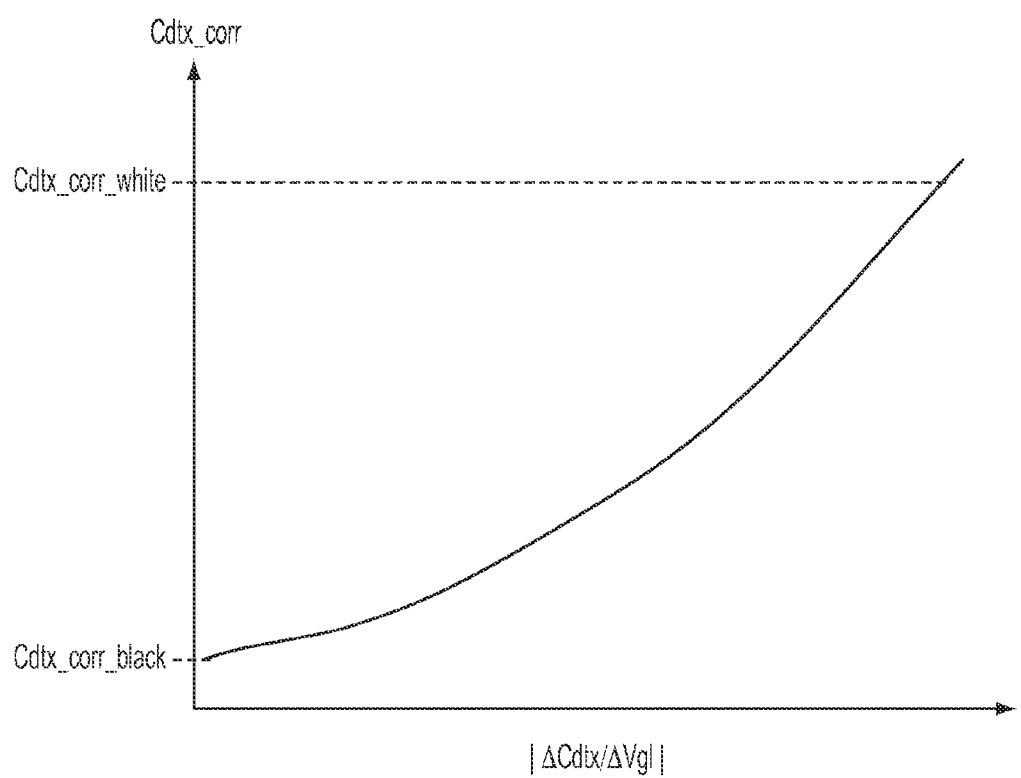
FIG. 8 illustrates a graph of change in crosstalk amounts per gate voltage from FIG. 7 that can be used to compensate for crosstalk in a touch sensitive display according to various embodiments.

In FIG. 7, the transfer function of crosstalk capacitance Cdtx can be a function of Vgl and the average pixel voltage Vtp across a given touch pixel region. Functions 70 through 73 show the depletion capacitance Cdtx as a function of Vgl for different average pixel voltage levels Vtp(Min) to Vtp (Max). As Vgl increases, the depletion in the TFT decreases and Cdtx increases. Note that because Vgl is negative, an increase of Vgl can result in a decrease of the absolute level of Vgl. For a white image, the average pixel voltage Vtp can be at a minimum, i.e. Cdtx can be highest such that the absolute slope $\Delta Cdtx/\Delta Vgl=(Cdtx1-Cdtx2)/(Vgl\_touch1-Vgl\_touch2)$. Therefore, the slope of the function Cdtx vs. Vgl can be directly mapped to the average pixel voltage of a given touch region. In order to perform crosstalk compensation, the slope of the function Cdtx vs. Vgl can be mapped to a correction factor Cdtx_corr=(Cdtx1+Cdtx2)/2−Cdtx_min, whereas Cdtx_min can be the minimum allowable crosstalk capacitance in a given application. FIG. 8 illustrates an exemplary transfer function that relates slope $\Delta Cdtx/\Delta Vgl$ to a crosstalk correction factor Cdtx_corr.

The crosstalk LUT can be generated for color codes gc=0 to 255, where each color code has a slope value NPIX_SLOPE and a corresponding crosstalk correction factor NDTX_CORR (71). The LUT can then be used during operation to compensate for crosstalk in a touch sensitive display.

It is to be understood that various crosstalk LUTs can be derived to account for crosstalk capacitance Cdtx dependencies for different parameters such as stimulus frequency, temperature, etc. In order to keep the memory requirements to a minimum, the crosstalk LUT transfer function can be represented by an nth order polynomial or a piecewise linear function, which can be sub-interpolated.

Figure 9:
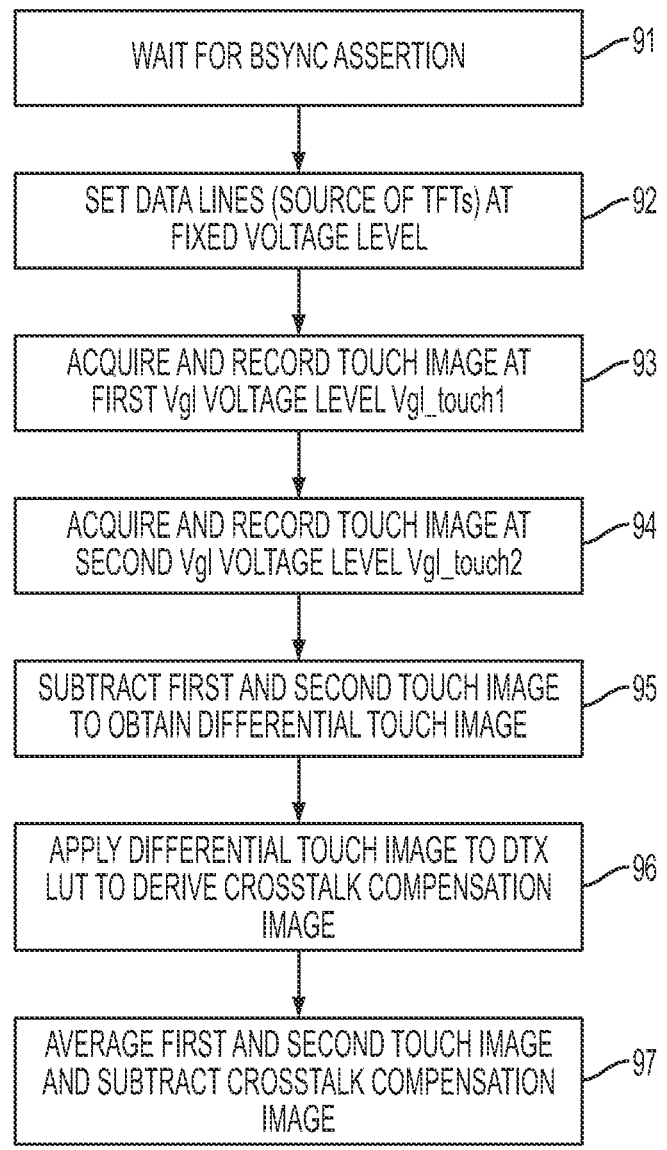
FIG. 9 illustrates an exemplary method using gate voltage adjustment to compensate for crosstalk in a touch sensitive display according to various embodiments.

FIG. 9 illustrates an exemplary method using gate voltage adjustment to compensate for crosstalk in a touch sensitive display according to various embodiments. In the example of FIG. 9, a Bsync signal can be asserted to transition from display mode to touch mode in a touch sensitive display (91). Upon a rising edge of Bsync, data lines connecting to TFT sources in an active area of the display can be set to a fixed voltage level (92). A first touch image can be acquired at a first Vgl voltage level Vgl_touch1 (93). A second touch image can be acquired at a second Vgl voltage level Vgl_touch2 (94). A differential touch image can be derived by subtracting the first and second touch images (95). Subtracting the first and second touch images can remove the touch component but preserve a residual crosstalk component representing $\Delta Cdtx/\Delta Vgl$. For each touch pixel in the differential touch image, a crosstalk correction factor can be found by applying the differential touch pixel to a crosstalk LUT, previously derived as in FIG. 6, resulting in a crosstalk compensation image (96). The first and second touch images can be averaged and the crosstalk compensation image subtracted from the averaged image (97). The resulting output can be a touch image compensated for crosstalk in the display.

In an alternate embodiment, during the touch mode, the touch sensitive display can scan its active area multiple times, rather than just twice, where the first scan can be done with a gate signal at a first voltage Vgl_touch1, the second scan at a second voltage Vgl_touch2, and so on to the nth scan at an nth voltage Vgl_touchn. Touch images from the multiple scans can be captured, where the touch images indicate different crosstalk amounts at the different gate voltages Vgl_touch1, Vgl_touch2, . . . Vgl_touchn. A crosstalk compensation image can be determined as described previously based on the captured images, the captured images can then be averaged, the determined crosstalk component can be subtracted from the averaged image, and the crosstalk compensated image can be outputted.

In another alternate embodiment, rather than averaging the captured images, a single one of the captured images can be selected and the determined crosstalk compensation image subtracted from that selected image. That selected image can be outputted as the crosstalk compensated image. Alternatively, a subset of the captured images can be selected and averaged, and the determined crosstalk compensation image subtracted from the averaged image of that selected subset. That averaged image can be outputted as the crosstalk compensated image.

It is to be understood that methods for crosstalk compensation are not limited to those illustrated in FIGS. 6 and 9, but can include additional or other actions for performing crosstalk compensation according to various embodiments.

Figure 10:
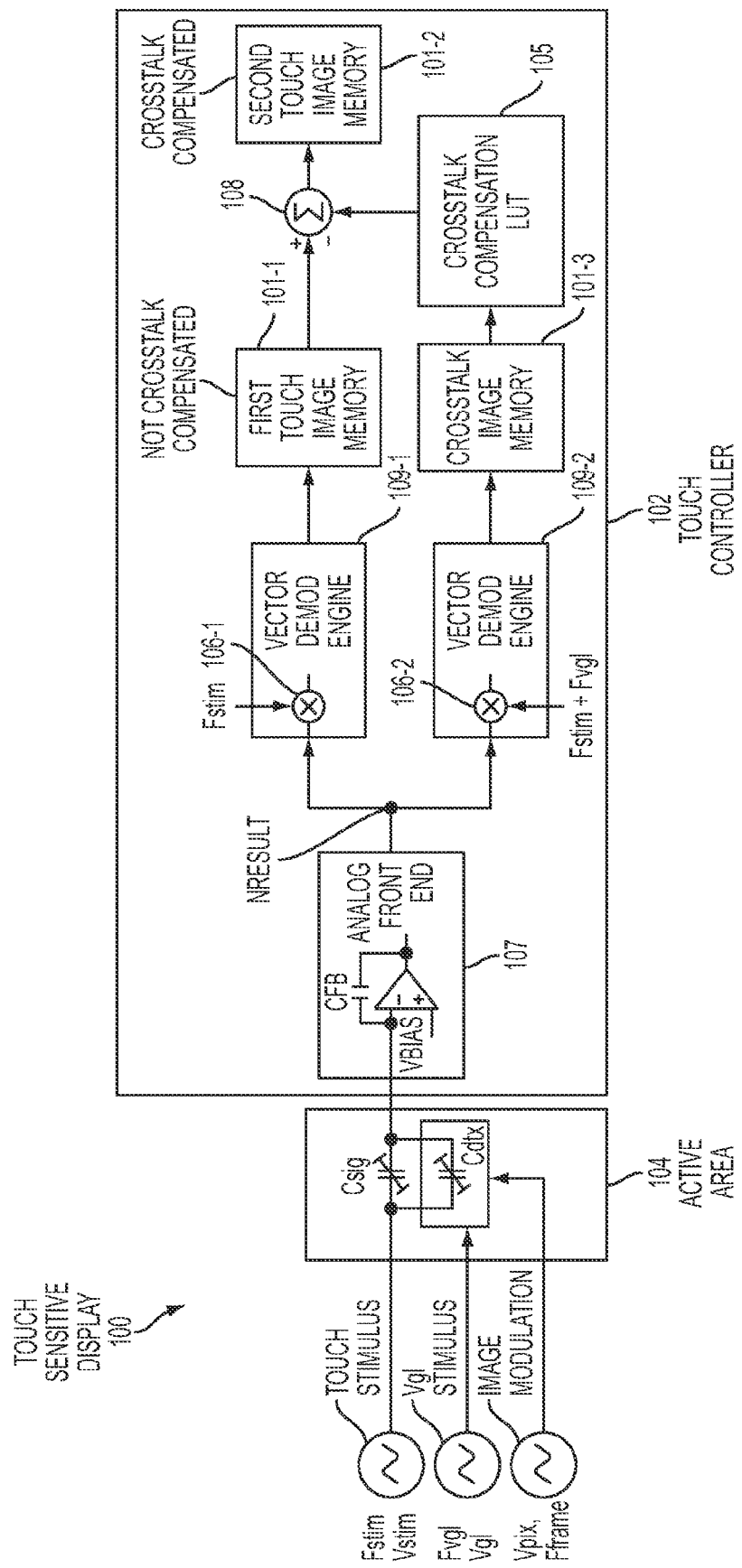
FIG. 10 illustrates another exemplary touch circuitry of a touch sensitive display having crosstalk compensation capabilities according to various embodiments.

FIG. 10 illustrates another exemplary touch circuitry of a touch sensitive display having crosstalk compensation capabilities according to various embodiments. In the example of FIG. 10, touch components of touch sensitive display 100 can be used to capture a touch image at a modulating gate voltage, determine how much to compensate for crosstalk based on the captured image, and output a crosstalk compensated touch image as a result. Touch stimulus of amplitude Vstim and frequency Fstim can drive a touch pixel in active area 104 of the display during the touch mode to form a capacitance Csig indicative of a touch or hover at the pixel. Gate stimulus of amplitude Vgl and frequency Fvgl can drive a TFT in the pixel and can be modulated in a manner, as described below, so as to help reduce, eliminate, or otherwise compensate for the crosstalk. The touch pixel capacitance, including Csig and Cdtx, can be inputted to analog front end 107 to generate a digital sense reading Nresult, which can be inputted to first vector demodulation engine 109-1 and second vector demodulation engine 109-2. The first vector demodulation engine 109-1 can include mixer 106-1 to multiply the sense reading Nresult with a digital demodulation signal of frequency Fstim. The demodulated touch results can be posted to first touch image memory 101-1 for subsequent processing. The second vector demodulation engine 109-2 can include mixer 106-2 to multiply the sense reading Nresult with a digital demodulation signal of frequency Fstim+Fvgl to pass the crosstalk components and reject the touch components. The demodulated touch results can be posted to crosstalk image memory 101-3 for subsequent processing. Crosstalk compensation LUT 105 can include crosstalk compensation values based on amounts of crosstalk in images. The appropriate crosstalk compensation values can be retrieved from the LUT 105 based on the crosstalk image from the crosstalk image memory 101-3. The retrieved crosstalk compensation values and the touch image data in the first touch image memory 101-1 can be inputted to subtractor 108, which can then subtract the compensation values from the touch image data and post the resulting crosstalk compensated image to second touch image memory 101-2 for further processing.

Figure 11:
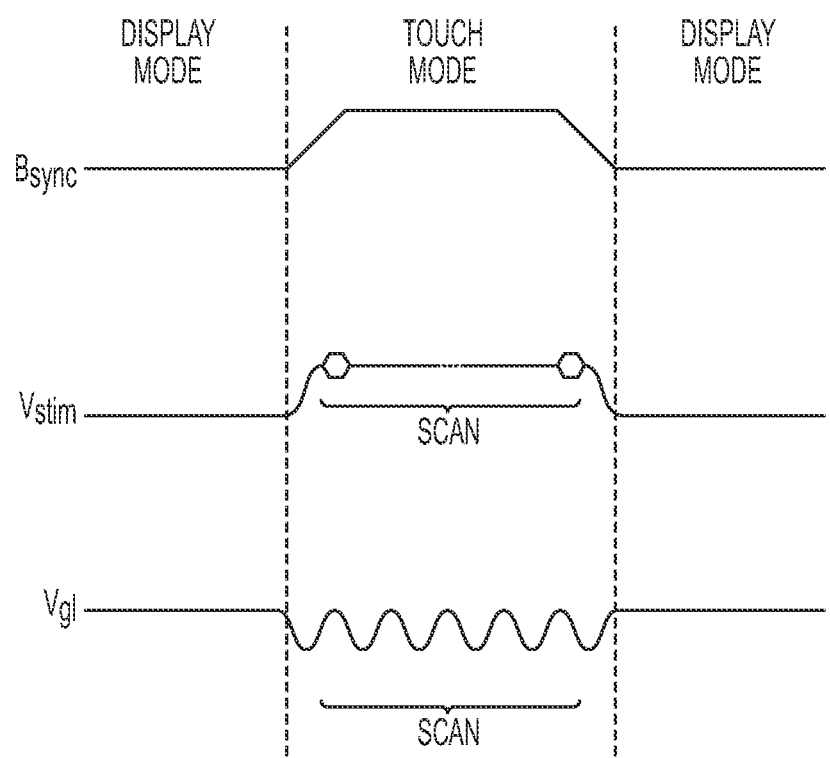
FIG. 11 illustrates another exemplary timing diagram of signals used for crosstalk compensation in a touch sensitive display according to various embodiments.

FIG. 11 illustrates an exemplary timing diagram of signals in touch circuitry, as in FIG. 10, of a touch sensitive display to compensate for crosstalk according to various embodiments. During the touch mode, the touch sensitive display can perform a scan of the active area pixels with a modulating gate voltage. As previously described, the gate voltage level can affect the strengths of the parasitic capacitances in the pixel TFTs and hence the crosstalk amounts. By modulating the gate voltage at an appropriate frequency and hence the TFTs, at least a portion of the crosstalk introduced by the gate voltage level can be pushed out of band, i.e., isolated and away from the frequency band of the sense signals. In some embodiments, the gate voltage can be modulated coincident with the steps of the scan. Accordingly, when the sense signals are demodulated, the residual crosstalk component can be compensated for based on the out-of-band crosstalk component. The timing diagram in FIG. 11 illustrates select signal outputs during the display and touch modes of the touch sensitive display to demonstrate this approach. The signals include a Bsync signal to cause transition to the touch mode, a stimulation signal Vstim to stimulate a pixel for sensing a touch or hover during the touch mode, and a gate signal to help facilitate reducing or eliminating crosstalk during the touch mode.

During the display mode, Bsync can be low indicating display mode, Vstim can be at or around zero because the active area is displaying rather than sensing, and Vgl can be low (and/or modulating). Note that, during display mode, Vgl can be any suitable value because it can be ignored until the touch mode, while Vgh can be used to provide the gate signals during the display mode, as described previously.

During the touch mode, Bsync can be high indicating touch mode, Vstim can have a positive or negative non-zero value to stimulate the pixels for sensing during a scan, and Vgl can modulate between a low value and a lower value during the scan. In some embodiments, during the touch mode, Vstim can have a DC component of 2.5V and an AC component of 4Vpp and Vgl modulates between −9 V and −12 V at a frequency of 20 kHz, thereby pushing the crosstalk component to ±20 kHz from the sense signals frequency of Fstim.

Although only two voltage levels in the modulating gate voltages are illustrated in FIG. 11, it is to be understood that multiple voltage levels can be used during the touch mode for the modulating gate voltages.

Figure 12:
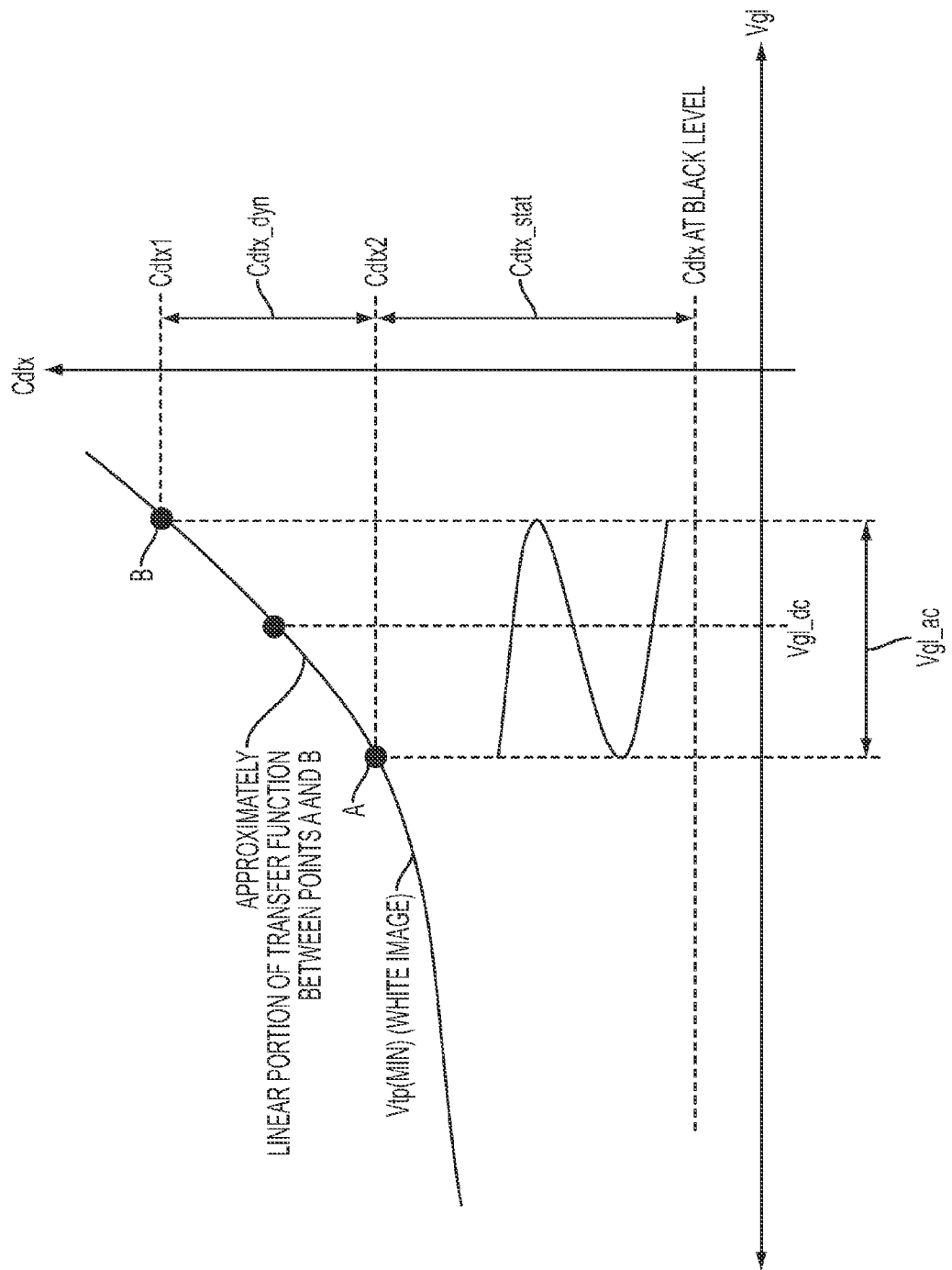
FIG. 12 illustrates another graph of gate driver voltage versus crosstalk amounts that can be used to compensate for crosstalk in a touch sensitive display according to various embodiments.

FIG. 12 shows the effects of gate voltage modulation with a dynamic Vgl voltage in a touch sensitive display according to various embodiments. The dynamic Vgl voltage can be defined as follows.

$$Vgl\_mod = Vgl\_ac/2*sin(2*pi*Fvgl*t) + Vgl\_dc,$$

where Vgl_ac=the dynamic Vgl component (e.g. 3Vpp), Vgl_dc=the static Vgl component (e.g. −10.5V), and Fvgl=the Vgl modulation frequency. For simplicity, Vgl_mod can be applied to the approximately linear portion of the Cdtx vs. Vgl transfer function between points A and B. The resultant modulated Cdtx_mod can therefore be as follows.

$$Cdtx\_mod(Fvgl) = \alpha_{VGL}*Vgl\_mod = \alpha_{VGL}*(Vgl\_ac/2*sin(2*pi*Fvgl*t) + Vgl\_dc),$$

where Cdtx_mod=the modulated Cdtx, and $\alpha_{VGL}$=the image dependent slope of the Cdtx vs. Vgl transfer function between points A and B. Note that Cdtx_mod(Fvgl) can also have non-linear terms, which have been omitted here for simplicity. The slope $\alpha_{VGL}$ can also be a function of the stimulus amplitude Vstim during touch mode. Note that the drain of the TFT can be modulated with the dynamic stimulus during touch mode and therefore, the slope of the Cdtx vs. Vgl transfer function between points A and B can vary with the stimulus voltage level. Therefore, $\alpha_{VGL}$ can be defined as follows.

$$\alpha_{VGL} = \alpha_{VGL\_AC}*Vstim/2*sin(2*pi*Fstim*t) + \alpha_{VGL\_DC},$$

where $\alpha_{VGL\_AC}$=the touch stimulus dependent slope of the Cdtx vs. Vgl transfer function and $\alpha_{VGL\_DC}$=the slope offset of the Cdtx vs. Vgl transfer function. Note that $\alpha_{VGL}$ can also have non-linear terms, which have been omitted here for simplicity.

By substitution, $$Cdtx\_mod(Fvgl) = \alpha_{VGL\_AC}*Vstim/2*\\Vgl\_ac/2*sin(2*pi*Fvgl*t)*sin(2*pi*Fstim*t) + \\\alpha_{VGL\_AC}*Vgl\_dc*Vstim/2*sin(2*pi*Fstim*t) + \\\alpha_{VGL\_DC}*Vgl\_ac/2*sin(2*pi*Fvgl*t) + \alpha_{VGL\_DC}*Vgl\_dc,$$

where the first term in above equation is the relevant dynamic term representative of the crosstalk image component and can be rewritten as follows.

$$Cdtx\_dyn = \alpha_{VGL\_AC}*Vstim/2*Vgl\_ac/2*½*(cos(2*pi*(Fstim-Fvgl)*t) - cos(2*pi*(Fstim+Fvgl)*t)).$$

The first cosine term can represent the left sideband and be proportional to the slope $\alpha_{VGL\_AC}$. Similarly, the second cosine term can represent the right sideband and be proportional to the slope $\alpha_{VGL\_AC}$. In order to recover Cdtx_dyn, vector demodulation can be performed at Fstim−Fvgl or Fstim+Fvgl. The second term in above equation is Cdtx_stat term representative of the uncompensated touch image component $$Cdtx\_stat = \alpha_{VGL\_AC}*Vgl\_dc*Vstim/2*sin(2*pi*Fstim*t).$$

The last two terms of above equation can be rejected during vector demodulation.

Figure 13:
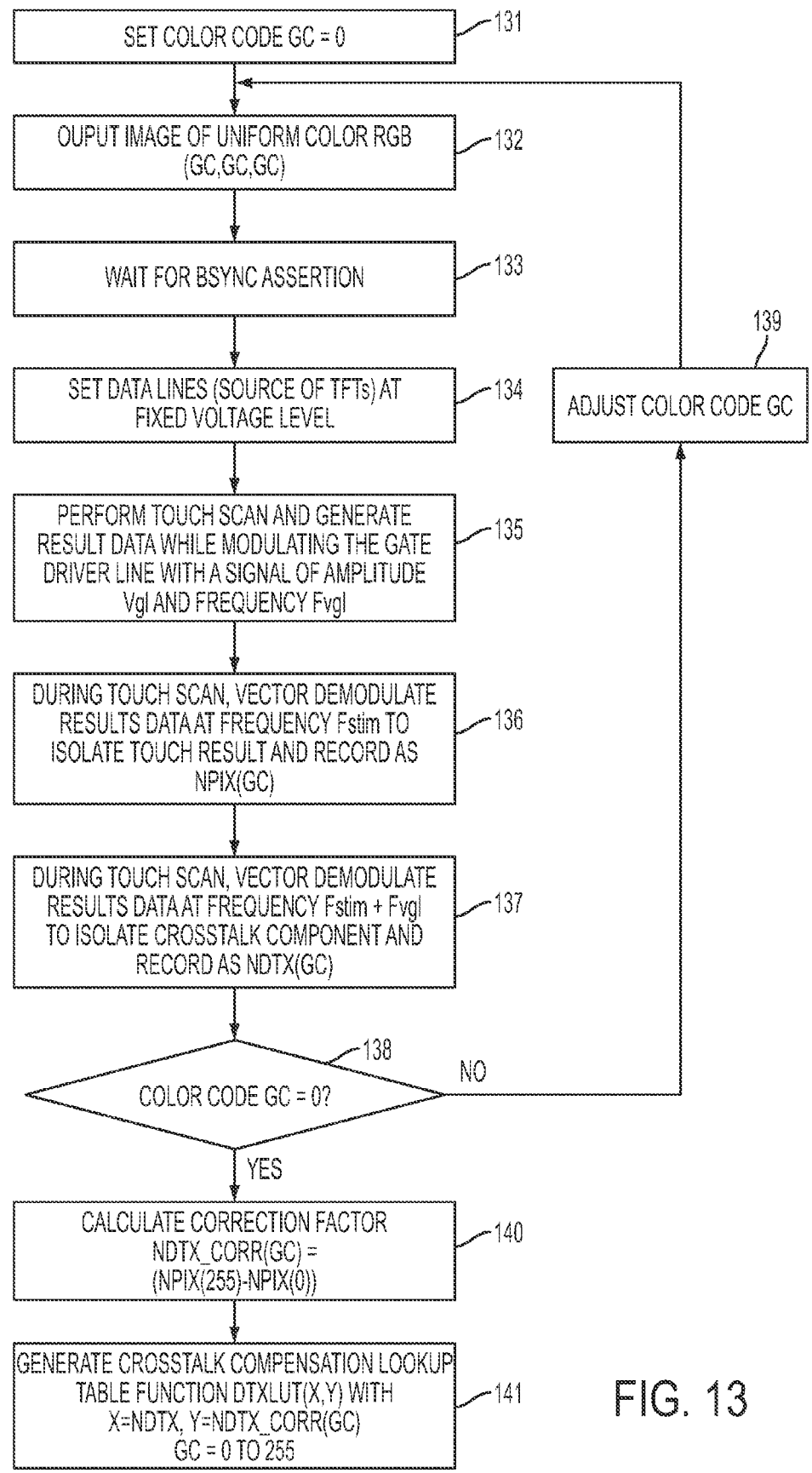
FIG. 13 illustrates an exemplary method for determining crosstalk compensation amounts using gate voltage modulation in a touch sensitive display according to various embodiments.

FIG. 13 illustrates an exemplary method for determining crosstalk compensation using gate voltage modulation in a touch sensitive display according to various embodiments. This method can be applied to the touch sensitive display of FIG. 10, for example. In some embodiments, this method can be applied during factory calibration of the display. In some embodiments, this method can be applied during startup or other operations of the display by a user. In the example of FIG. 13, a color code gc can be set to zero (131). A uniform color image having the red, green and blue components set to the color code gc of zero can be outputted from the display controller (132). In some instances, a white image can have a color code gc=255 (i.e. RGB(255,255,255)), while a black image can have a color code gc=0 (i.e. RGB(0,0,0)), etc. The display controller can assert a Bsync signal (133). Upon a rising edge of Bsync, data lines connecting to the TFT sources in the display active area can be set at a fixed voltage level (134). This can ensure that the source biases of the connected TFTs are constant and independent of the voltage level output prior to entering touch mode. While modulating the gate driver line with a dynamic Vgl stimulus of Vgl_ac (e.g. 3Vpp) relative to a DC voltage level Vgl_dc (e.g. −10.5V) at a frequency Fvgl (e.g. 20 KHz), a touch scan can be performed and touch image data captured (135). The captured touch image data can be vector demodulated at Fstim to isolate touch and residual crosstalk components in the data and recorded as NPIX(gc) (136) and also vector demodulated at Fstim+Fvgl to isolate crosstalk components needed to compensate for residual crosstalk components in the touch image data and recorded as NDTX(gc) (137). The above actions (132)-(137) can be repeated for one or more color codes gc from 1 to 255 (139).

After the touch image data has been captured at the desired color code levels (138), a crosstalk LUT can be derived as follows. The captured touch pixels at the various color codes gc and modulating voltage Vgl can be plotted as shown in FIG. 12. A crosstalk correction factor NDTX_CORR(gc) can be calculated as NPIX(255)-NPIX(0) at each color code gc, where NPIX(255) is proportional to Cdtx_stat for Vtp(Min) and NPIX(0) is proportional to Cdtx_stat at Vtp(Max) (140). The crosstalk LUT can be generated for color codes gc=0 to 255, where each color code has a slope value NDTX representative of Cdtx_dyn and a corresponding crosstalk correction factor NDTX_CORR (141).

It is to be understood that multiple crosstalk LUTs can be derived to account for crosstalk capacitance Cdtx dependencies for different parameters such as stimulus frequency, temperature, etc. In order to keep the memory requirements to a minimum, the crosstalk LUT transfer function can be represented by an nth order polynomial or a piecewise linear function, which can be sub-interpolated.

Figure 14:
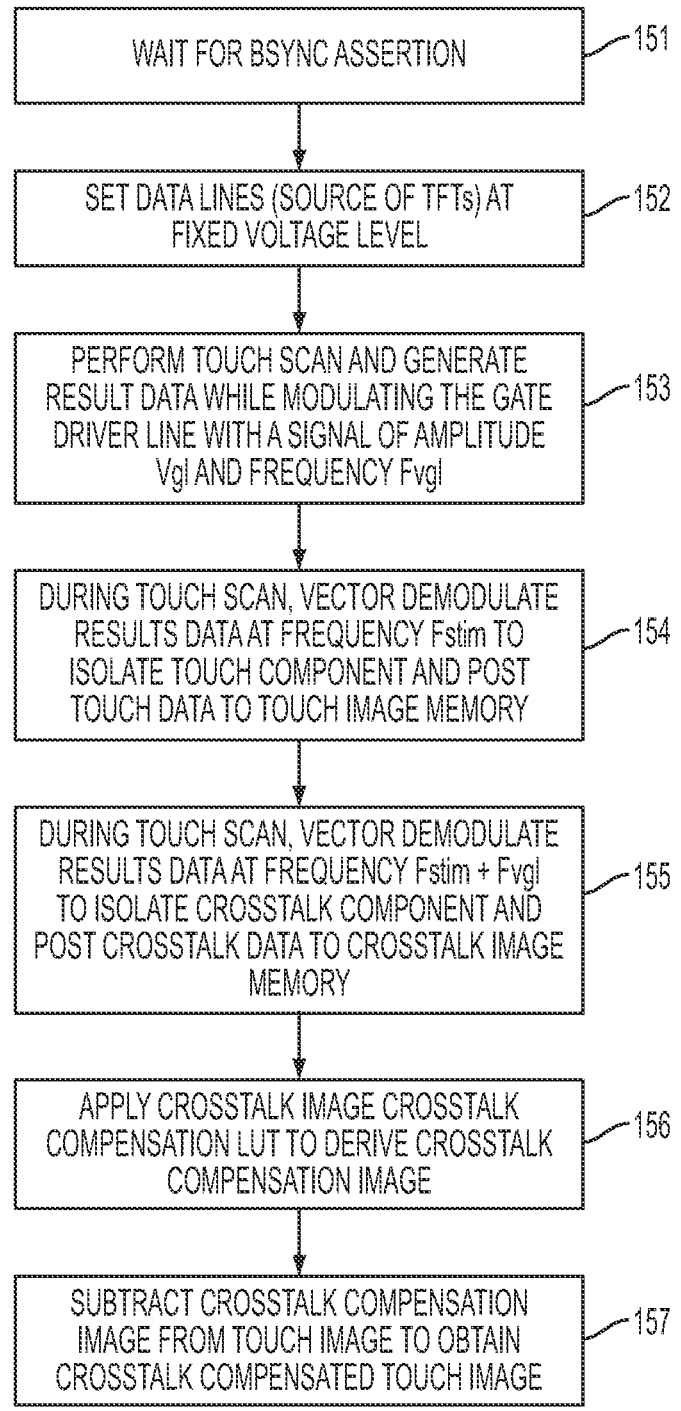
FIG. 14 illustrates an exemplary method using gate voltage modulation to compensate for crosstalk in a touch sensitive display according to various embodiments.

FIG. 14 illustrates an exemplary method using gate voltage modulation to compensate for crosstalk in a touch sensitive display according to various embodiments. In the example of FIG. 14, a Bsync signal can be asserted to transition into touch mode of a display (151). After a rising edge on Bsync, data lines connecting to TFT sources can be set at a fixed voltage level (152). While modulating a gate driver line with a dynamic Vgl stimulus of Vgl_ac (e.g. 3Vpp) relative to a DC voltage level Vgl_dc (e.g. −10.5V) at a frequency Fvgl (e.g. 20 KHz), a touch scan can be performed and touch image data captured (153). While performing the touch scan, the touch image data can be vector demodulated at Fstim to derive touch and residual crosstalk components and posted to a first touch image memory (154). While performing the touch scan, the touch image data can also be vector demodulated at Fstim+Fvgl to isolate crosstalk components needed to compensate for residual touch components and posted to a second touch image memory (155). The isolated crosstalk components from the second touch image memory can be applied to a crosstalk compensation LUT to derive a crosstalk compensation image (156). The crosstalk compensation LUT can be previously derived as described in FIG. 13, for example. The crosstalk compensation image can be subtracted from the touch image posted to the first touch image memory to obtain a crosstalk compensated image (157).

It is to be understood that methods for crosstalk compensation are not limited to those illustrated in FIGS. 13 and 14, but can include additional or other actions for performing crosstalk compensation according to various embodiments.

Figure 15:
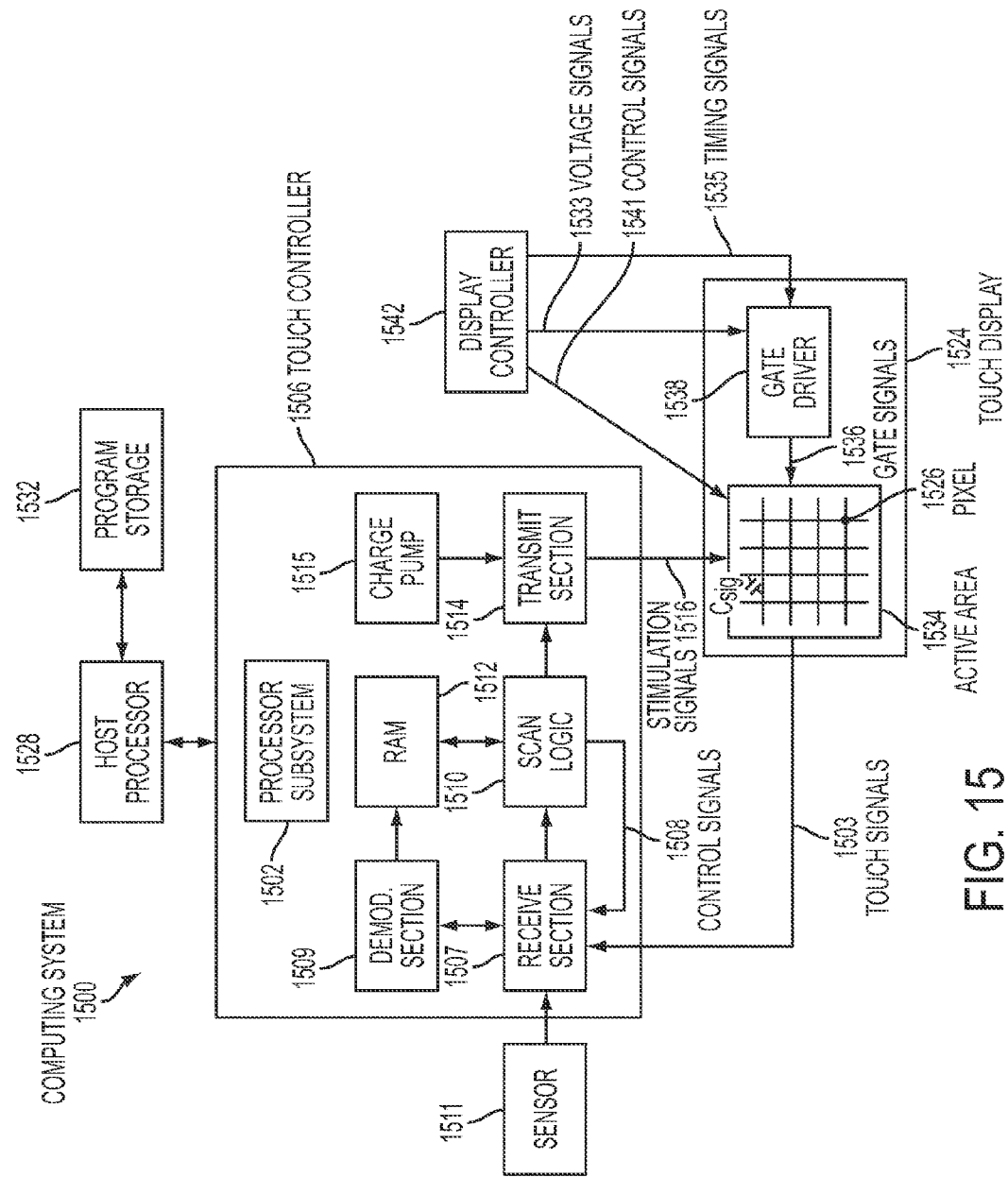
FIG. 15 illustrates an exemplary computing system having crosstalk compensation capabilities according to various embodiments.

FIG. 15 illustrates an exemplary computing system that can have crosstalk compensation capabilities according to various embodiments. In the example of FIG. 15, computing system 1500 can include touch controller 1506. The touch controller 1506 can be a single application specific integrated circuit (ASIC) that can include one or more processor subsystems 1502, which can include one or more main processors, such as ARM968 processors or other processors with similar functionality and capabilities. However, in other embodiments, the processor functionality can be implemented instead by dedicated logic, such as a state machine. The processor subsystems 1502 can also include peripherals (not shown) such as random access memory (RAM) or other types of memory or storage, watchdog timers and the like. The touch controller 1506 can also include receive section 1507 for receiving signals, such as touch (or sense) signals 1503 of one or more sense channels (not shown), other signals from other sensors such as sensor 1511, etc. The touch controller 1506 can also include demodulation section 1509 such as a multistage vector demodulation engine, display scan logic 1510, and transmit section 1514 for transmitting stimulation signals 1516 to touch display 1524 to drive the display. The scan logic 1510 can access RAM 1512, autonomously read data from the sense channels, and provide control for the sense channels. In addition, the scan logic 1510 can control the transmit section 1514 to generate the stimulation signals 1516 at various frequencies and phases that can be selectively applied to rows of the touch display 1524.

The touch controller 1506 can also include charge pump 1515, which can be used to generate the supply voltage for the transmit section 1514. The stimulation signals 1516 can have amplitudes higher than the maximum voltage by cascading two charge store devices, e.g., capacitors, together to form the charge pump 1515. Therefore, the stimulus voltage can be higher (e.g., 6V) than the voltage level a single capacitor can handle (e.g., 3.6 V). Although FIG. 15 shows the charge pump 1515 separate from the transmit section 1514, the charge pump can be part of the transmit section.

Computing system 1500 can include display controller 1542. The display controller 1542 can be a single application specific integrated circuit (ASIC) that can include one or more processor subsystems (not shown), which can include one or more main processors, such as ARM968 processors or other processors with similar functionality and capabilities. However, in other embodiments, the processor functionality can be implemented instead by dedicated logic, such as a state machine. The processor subsystems can also include peripherals such as random access memory (RAM) or other types of memory or storage, watchdog timers and the like. The display controller 1542 can control the touch display 1524 during the display mode. The display controller 142 can supply voltage signals 1533 and timing signals 1535 to the gate driver 1538 to cause the gate driver to drive the touch display 1524 via the gate signals 1536 during the display mode and the touch mode. The display controller 1542 can also transmit pixel control signals 1541 via source drivers (not shown) to the active area 1534 to facilitate the displaying of data at the touch display 1524.

Computing system 1500 can include host processor 1528 for receiving outputs from the processor subsystems 1502 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1528 can also perform additional functions that may not be related to touch processing.

Touch display 1524 can include active area 1534 having touch and hover sensing circuitry that can include a capacitive sensing medium having drive lines and sense lines. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. Drive lines can be driven by stimulation signals 1516 and resulting touch signals 1503 generated in sense lines can be transmitted to receive section 1507 in touch controller 1506. In this way, drive lines and sense lines can be part of the touch and hover sensing circuitry that can interact to form capacitive sensing nodes, which can be thought of as touch picture elements (touch pixels), such as touch pixels 1526. This way of understanding can be particularly useful when touch display 1524 can be viewed as capturing an "image" of touch. In other words, after touch controller 1506 has determined whether a touch or hover has been detected at each touch pixel in the touch display, the pattern of touch pixels in the touch display at which a touch or hover occurred can be thought of as an "image" of touch (e.g. a pattern of fingers touching or hovering over the touch display).

The touch display 1524 can also include gate driver 1538, which can receive the voltage signals 1533 and the timing signals 1535 and generate gate signals 1536 for driving the active area 1534 of the touch display 1524 to display data during the display mode and to help reduce crosstalk and to sense a touch or hover during the touch mode.

Note that one or more of the functions described above, can be performed, for example, by firmware stored in memory (e.g., one of the peripherals) and executed by the processor subsystem 1502, or stored in the program storage 1532 and executed by the host processor 1528. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch display, as described in FIG. 15, can sense touch and hover according to various embodiments. In addition, the touch display described herein can be either single- or multi-touch.

Figure 16:
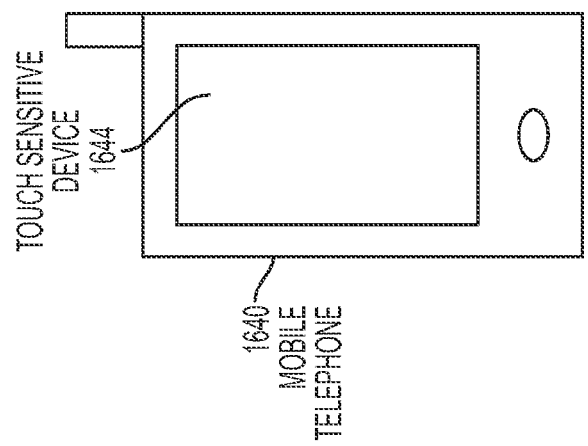
FIG. 16 illustrates an exemplary mobile telephone having crosstalk compensation capabilities according to various embodiments.

FIG. 16 illustrates an exemplary mobile telephone 1640 that can include touch sensitive display 1644 and other computing system blocks for crosstalk compensation according to various embodiments.

Figure 17:
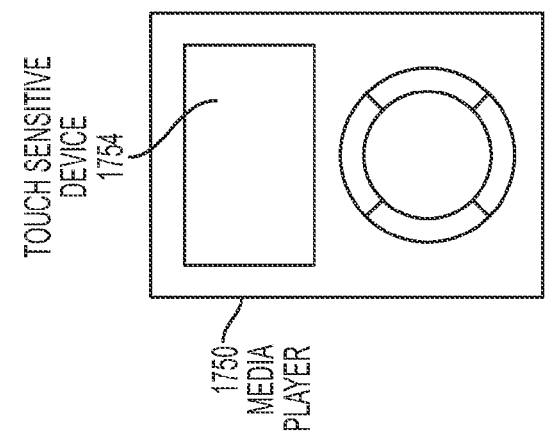
FIG. 17 illustrates an exemplary digital media player having crosstalk compensation capabilities according to various embodiments.

FIG. 17 illustrates an exemplary digital media player 1750 that can include touch sensitive display 1754 and other computing system blocks for crosstalk compensation according to various embodiments.

Figure 18:
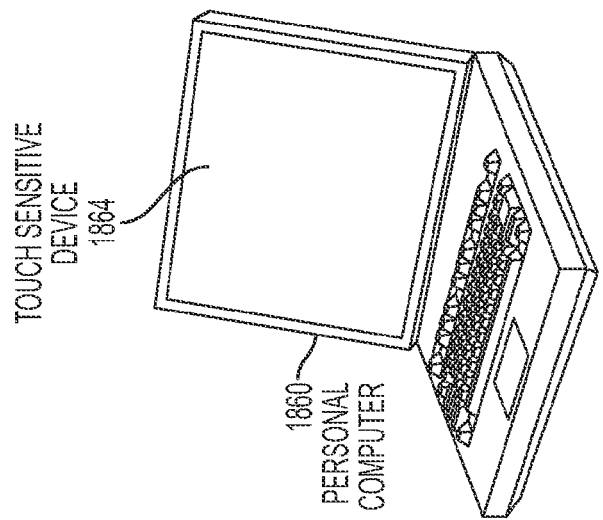
FIG. 18 illustrates an exemplary personal computer having crosstalk compensation capabilities according to various embodiments.

FIG. 18 illustrates an exemplary personal computer 1860 that can include touch sensitive display 1864 and other computing system blocks for crosstalk compensation according to various embodiments.

The mobile telephone, media player, and personal computer of FIGS. 16 through 18 can have improved touch and hover sensing as a result of compensating for crosstalk in the devices according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method of compensating for crosstalk generated in a touch sensitive display, the method comprising:
applying first gate voltages to gates of display pixels, the first gate voltages having voltage levels operative for display data during a display mode of operation;
during a touch sensing mode of operation, performing multiple touch scans to generate multiple touch images, the multiple touch images obtained by applying multiple different second gate voltage levels to the gates of the display pixels, the multiple different second gate voltage levels being different from the first gate voltage levels and each operative to inhibit a display function of the display pixels;
comparing the touch images to determine a crosstalk component introduced into the display; and
subtracting the determined crosstalk component from at least one of the touch images to provide a crosstalk compensated touch image.

2. The method of claim 1, wherein performing the multiple scans comprises:
setting an input of a display component, comprising at least the gates of the display pixels, at a predetermined level;
driving the display component at each of the multiple voltages; and
scanning pixels of the display during each driving to generate a corresponding one of the touch images, each corresponding image having the crosstalk therein.

3. The method of claim 1, wherein comparing the touch images comprises:
subtracting at least two of the touch images to provide a crosstalk image indicative of the crosstalk component; and
determining the crosstalk component based on the crosstalk touch image.

4. The method of claim 1, wherein subtracting the determined crosstalk component comprises:
averaging the multiple touch images; and
subtracting the determined crosstalk component from the averaged image to provide the crosstalk compensated image.

5. The method of claim 1, comprising generating a lookup table to determine the crosstalk component.

6. The method of claim 5, wherein generating the lookup table comprises:
setting a display component, comprising at least the gates of the display pixels, to display a predetermined value;
setting an input of the display component to a predetermined level;
driving the display component at each of the multiple voltages;
scanning the display pixels during each driving to generate a corresponding crosstalk image, the corresponding crosstalk touch images having different amounts of crosstalk therein for each driving; and
repeating setting the display component, setting the input, driving, and scanning at multiple displayed predetermined values to acquire multiple crosstalk touch images.

7. The method of claim 6, wherein generating the lookup table comprises:
for each displayed predetermined value, determining the crosstalk component based on the corresponding generated crosstalk touch images; and
providing in the lookup table correlations between the generated crosstalk touch images and the determined crosstalk components.

8. The method of claim 1, comprising outputting the crosstalk compensated image.

9. A touch sensitive display comprising:
an active area including pixels having display components including gates for displaying data during a display mode and touch components for sensing a touching or hovering object during a touch sensing mode;
a gate driver configured to drive the gates of the display components with gate voltage levels for displaying data during the display mode;
the gate drive configured to drive the gates of the display components with multiple different gate voltage levels during the touch sensing mode, the multiple different voltage levels being different from the gate voltage levels for displaying data during the display mode and the multiple different voltage levels effective for inhibiting a display function of the display; and a display controller configured to control adjustment of the multiple different gate voltage levels so as to compensate for crosstalk introduced by the display components during the touch sensing mode.

10. The display of claim 9, comprising a touch controller configured to drive the active area with a stimulation signal during the touch sensing mode and to receive a sense signal from the active area indicative of the touching or hovering object, the sense signal including the crosstalk.

11. The display of claim 9, wherein the multiple different gate voltage levels are associated with multiple sense signals having the crosstalk.

12. The display of claim 11, comprising a processor configured to determine the crosstalk in the sense signals and to compensate for the determined crosstalk.

13. The display of claim 9, wherein the display components include thin film transistors configured to receive the multiple different gate voltage levels.

14. A method of compensating for crosstalk in a touch sensitive display, the method comprising:
   driving a display pixel with a modulating voltage and a stimulation voltage to generate an output, the output having crosstalk therein, the display pixels including display components for displaying data and touch components for sensing a touching or hovering object, and wherein the driving includes;
   driving the display components with the modulating voltage, the modulating voltage having a range of different voltage levels, the display components causing the crosstalk; and
   driving the touch components with the stimulation voltage, the touch components generating the output indicative of the touching or hovering object;
   while driving the touch components with the stimulation voltage, applying multiple different sate voltage levels to gates of the display pixel, each of the multiple different gate voltage :levels operative to inhibit a display function of the display pixel;
   demodulating the output to isolate the crosstalk therefrom;
   determining a crosstalk compensation factor based on the isolated crosstalk; and
   applying the determined crosstalk compensation factor to the output to provide a crosstalk compensated output.

15. The method of claim 14, wherein demodulating the output comprises:
   demodulating the output at a first demodulation frequency to isolate touch components indicative of a touching or hovering object at the display; and
   demodulating the output at a second demodulation frequency to isolate crosstalk components indicative of the crosstalk.

16. The method of claim 14, wherein determining the crosstalk compensation factor comprises:
   retrieving from a lookup table the crosstalk compensation factor corresponding to the isolated crosstalk, the lookup table including correlations between crosstalk amounts and crosstalk compensation factors.

17. The method of claim 14, wherein applying the crosstalk compensation factor comprises:
   subtracting the compensation factor from the output to provide the crosstalk compensated output.

18. The method of claim 14, comprising generating a crosstalk lookup table including:
   setting at least one display component of the display pixel to display a predetermined value, the display component causing the crosstalk;
   setting an input of the display component to a predetermined level;
   driving the display pixel at the modulating voltage to generate the output;
   demodulating the output at a first demodulation frequency to isolate signals indicative of a touch or hover at the display;
   demodulating the output at a second demodulation frequency to isolate the crosstalk;
   repeating setting the display component, setting the input, driving, demodulating at the first demodulation frequency, and demodulating at the second demodulation frequency at multiple displayed predetermined values to acquire multiple isolated signals and isolated crosstalks;
   for each displayed predetermined value, calculating a crosstalk compensation factor based on the corresponding isolated signals and isolated crosstalk; and
   providing in the lookup table correlations between the isolated crosstalks and the calculated crosstalk compensation factors.

19. A touch sensitive display comprising:
   a display pixel having a gate line;
   a circuit coupled to the gate line to transmit display voltage levels to the pixel during a display mode;
   the circuit operative to transmit multiple different voltage levels to the gate line during a touch mode of the display, the multiple different voltage levels being different from the display voltage levels, and each operative to inhibit a display function of the display pixel; and
   logic for adjusting the multiple different voltage levels to the gate line during the touch mode so as to compensate for crosstalk introduced into the display;
   a stimulation voltage source configured to drive touch components with a stimulation voltage to generate an output, the output having the crosstalk therein; and
   a demodulator configured to reject the crosstalk and otherwise retain the output.

20. The display of claim 19, wherein the logic adjusts the voltage to multiple levels to generate multiple images having the crosstalk, and
   wherein the logic determines the crosstalk from the images and compensates the images for the determined crosstalk.

21. The display of claim 19, wherein the logic modulates the voltage between multiple amplitudes so as to isolate the frequency of the crosstalk for removal.

22. The display of claim 19 incorporated into at least one of a mobile phone, a digital media player, or a personal computer.

* * * * *